United States Patent [19]
Wight et al.

[11] Patent Number: 5,481,479
[45] Date of Patent: Jan. 2, 1996

[54] NONLINEAR SCANNING TO OPTIMIZE SECTOR SCAN ELECTRO-OPTIC RECONNAISSANCE SYSTEM PERFORMANCE

[75] Inventors: Ralph H. Wight, Northport; Gregory J. Wolfe, Port Jefferson Station, both of N.Y.

[73] Assignee: Loral Fairchild Corp., Syosset, N.Y.

[21] Appl. No.: 988,837

[22] Filed: Dec. 10, 1992

[51] Int. Cl.⁶ .......................... G02B 15/16; G01C 11/02
[52] U.S. Cl. ........................ 364/525; 348/144; 348/147; 364/456
[58] Field of Search .................. 364/514, 516, 364/517, 423, 456, 525; 358/113, 109, 448, 451; 348/144, 146, 147, 98, 106, 135

[56] References Cited

U.S. PATENT DOCUMENTS

| | | | |
|---|---|---|---|
| 3,952,151 | 4/1976 | Jenkin | 358/109 |
| 4,152,725 | 5/1979 | Beckmann | 358/109 |
| 4,303,945 | 12/1981 | Fawcett et al. | 358/109 X |
| 4,453,087 | 6/1984 | Linick | 250/334 |
| 4,482,902 | 11/1984 | Bailey et al. | 346/108 |
| 4,630,111 | 12/1986 | Blain et al. | 358/109 |
| 5,028,998 | 7/1991 | Westell | 348/147 |
| 5,043,924 | 8/1991 | Hofmann | 364/525 |

FOREIGN PATENT DOCUMENTS

| | | |
|---|---|---|
| 0071531 | 9/1983 | European Pat. Off. . |
| 2165120 | 4/1986 | United Kingdom . |

Primary Examiner—Emanuel T. Voeltz
Assistant Examiner—Edward Pipala
Attorney, Agent, or Firm—Sterne, Kessler, Goldstein & Fox

[57] ABSTRACT

Long range, non-linear, sector scan panoramic electro-optical reconnaissance of a scene from an airborne craft is performed at increased aircraft velocities with a given detector technology at a desired level of performance. A focal plane array is configured to detect an image of the scene, and to convert the image into electronic charge information representing the image. A main electronics unit that converts the electronic charge representation into an electronic signal which is a digital representation of the image. A lens arrangement is used to focus a narrow slit of the scene onto the focal plane array, and a rotating prism scans the slit across the scene at a non-linear scanning velocity as determined according to the present invention. The electronic signal is transmitted to a ground station where it is processed to provide visual image data and that represents the scene, distortion induced into this data as a result of the non-linear scan velocity is removed to provide a distortion free final image.

30 Claims, 7 Drawing Sheets

NONLINEAR SCANNING TO OPTIMIZE SECTOR SCAN ELECTRO-OPTIC RECONNAISSANCE SYSTEM PERFORMANCE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

The present invention relates generally to electro-optical reconnaissance systems, and more particularly, to non-linear scanning to optimize the performance of electro-optical reconnaissance systems.

2. Related Art

Electro-optical systems enjoy widespread use in contemporary reconnaissance systems. There are three primary reasons for this popularity. The first reason is that these systems are able to operate in real time. In other words, these systems are able to process and interpret dam as it is collected. These systems collect data using an airborne camera system, transmit the data to a ground station via an air-to-ground data link, and process the data at the ground station as it is received. This allows data to be interpreted much more quickly than similar data recorded on photographic film, flown back to a home base, and processed subsequent to the flight operation.

A second advantage is the ability of the electro-optical system to penetrate haze. This ability is made possible by signal processing techniques which are able to separate and enhance the data information from background noise (haze). This ability does not exist with conventional photographic reconnaissance techniques since it is not possible to remove the effects of background noise.

Additionally, because of the high sensitivity of electro-optical detectors, electro-optical systems can operate with less ambient light than photographic systems. This has the effect of extending the amount of time per day during which a reconnaissance mission can be flown.

There are typically two general forms of electro-optical reconnaissance systems. FIG. 1 illustrates the two general forms of electro-optical reconnaissance systems. In a first mode, called a strip mode system, the area detected by the electro-optical system is a long, narrow slit which can be described as a projection of a slit 104. The projection of slit 104 is the area detected (projected) by a focal plane array (FPA) of the system. The FPA is mounted in an aircraft 102. A lens arrangement is used to focus slit 104 onto the FPA. Typically, the FPA is a line of optical sensor devices such as CCDs. In a strip mode system, the projection of the slit 104 extends at right angles to the direction of flight and constitutes one dimension of the image. The direction of flight is shown by a flight path 122. The second dimension of the image is generated by the forward motion of aircraft 102 as it flies along flight path 122 at a velocity V.

In this specification, the direction of forward motion of the aircraft will be referenced as the in-track direction. The direction at a right angle to the flight path is referred to as the cross-track direction.

The second mode is a sector scan panoramic mode (sector scan mode). In the sector scan mode, the line of detectors in the FPA is aligned in the in-track direction. Hence, a projection 106 of the FPA is in the in-track direction. Projection 106 is scanned at a right angle to the flight path (the cross-track direction) across the scene to be imaged. Scanning in the cross-track direction provides the second dimension of the image.

For long-range aerial surveillance applications, long-range oblique photography (LOROP) systems are utilized. A typical LOROP system uses an aircraft-mounted electro-optical camera configured to scan a scene at or near the horizon in the sector-scan mode. The scanned objects are focused by a lens or other optics onto the FPA. A rotating prism may be used to scan projection 106 in the cross-track direction across the scene to be sampled. The FPA is often one picture element (pixel) high and several thousand pixels wide.

The electro-optical camera generates an electronic signal that represents an image of the scene scanned. This signal is downlinked to a ground station where it is converted into visual information.

Referring again to FIG. 1, a LOROP system will be described in more detail. An airplane 102 flies at an altitude A above the ground and at a ground distance D from the scene to be photographed. Airplane 102 travels at velocity V in the in-track direction parallel to the scene. The line-of-sight distance between airplane 102 and the scene is defined as a slant range $\rho_{slant}$. For long-range (LOROP) applications, slant range $\rho_{slant}$ is large. (For example, in a typical application, $\rho_{slant}$ can be on the order of 40 nautical miles).

The FPA and associated optics are mounted in airplane 102. A depression angle $\theta_d$ is defined as the angle of the camera's line-of-sight with respect to a horizontal plane. A rotating camera barrel causes projection 106 to be scanned across the scene at or near the horizon. Velocity V of airplane 102 in the in-track direction and parallel to the scene causes the camera to photograph adjacent slices of the scene. Each adjacent slice forms a complete picture.

FIG. 2 illustrates these scanned slices in more detail. Referring to FIGS. 1 and 2, the length of each slice is determined by the distance covered by the scanning motion of the camera in the cross-track direction. This length is referred to as a cross-track field-of-coverage 202. The width of each slice in the in-track direction is defined by the focal plane array width, the focal length of the optics, and the distance between the camera and the scene. This width is known as the in-track field-of-coverage 204. The slices overlap each other in the in-track direction by an amount known as a forward overlap 206. Forward overlap 206 ensures that no part of the scene is left unscanned.

In-track field-of-coverage 204 is a function of the $\rho_{slant}$. According to lens arrangements typically employed, in-track field-of-coverage 204 is larger (larger on the ground, but the same angular coverage) at the far end of the scan (far-field point of scan) than it is at the point of scan closest to the aircraft (near-field point of scan). This phenomenon is not illustrated in FIG. 2 for simplicity. Instead, FIG. 2 illustrates an in-track field-of-coverage 204 as the same for both the near-field and the far-field point of scan.

A vertical scan velocity (in the cross-track direction) is selected so that for a given airplane 102 velocity V, a specified amount of forward overlap 206 is obtained. The amount of forward overlap 206 specified is chosen so that no image information is missed between scans. As the velocity V of airplane 102 increases, the vertical scan velocity must also increase to maintain the specified amount of forward overlap 206.

To obtain optimum system resolution, the information in the FPA must be read each time the vertical scan causes the FPA to traverse the area projected by each pixel. As more area is detected (projected) by a pixel between FPA reads (i.e., as scanning velocity increases), system resolution diminishes. Thus, to maintain system resolution, as the vertical scan velocity increases, the rate at which the information in the FPA is read must increase as well. Because the rate a which the information in the FPA may be read is limited by detector technologies, the vertical scan velocity is limited to a practical maximum rate. Since vertical scan velocity is bounded to a practical maximum by the maximum FPA read rate, and since an increase in vertical scan velocity is required to maintain a specified forward overlap 206 as airplane 102 velocity V increases, velocity V is limited to a maximum. Thus, for a given resolution and forward overlap, the operational velocity V at which sector-scan panoramic reconnaissance can be performed is limited to a maximum. Conventional LOROP systems have not been able to overcome this limitation without sacrificing resolution.

Note that in this document, system resolution is defined in terms of some constant number of line pairs per unit length on the ground.

What is needed is a system and method for increasing the operational velocity V at which an aircraft performing electro-optical reconnaissance can fly while maintaining a specified forward overlap 206, and maintaining system resolution to a given level.

SUMMARY OF THE INVENTION

The present invention is an apparatus and method for extending the operational velocity of sector-scanning panoramic LOROP without sacrificing system resolution.

The present invention is directed toward a system and method for increasing the scan velocity of a sector scan electro-optic reconnaissance system while maintaining a specified level of forward overlap and system resolution as defined above. The present invention takes advantage of increased resolution inherent in the near field portions of the scan. As the camera scans from the far field to the near field, the scan velocity is increased. This increase in scan velocity allows the system to trade increased near-field resolution in exchange for an increased scan velocity. Increasing the scan velocity in the near field results in an overall increase in the scan rate, while maintaining a specified level of system resolution. This increase in the scan rate allows the aircraft to operate at a greater velocity without sacrificing forward overlap.

According to the present invention, calculations are performed to determine the desired camera scan rate given the operational parameters of the mission. An associated FPA read rate, required to meet performance specifications (particularly resolution) at the determined scan rate, is calculated. For faster camera scan rates, the FPA read rate must also be faster. At camera scan rates above a threshold value, the FPA must be read at a rate faster than the detector technology permits. If the calculated FPA read rate exceeds the system maximum, then the scan velocity will have to vary as a function of time.

In the case of a varying scan rate, the scan velocity is at threshold at the far field point of the scan and increases as the scan progresses through the near field. This increase results in an increase in the overall scan velocity of a camera for the scan cycle. The non-linear scan velocity used throughout each scan is determined using either an exact solution or a polynomial approximation.

The camera is scanned across the scene at the non-linear velocity determined above. Thus, an image of the scanned scene is focused onto the focal plane array. Dam are read out of the focal plane array at periodic intervals thus causing strips of the scanned scene to be electronically photographed. This data is an electronic signal comprising digital image dam. The signal is sent to a ground station for processing to ultimately obtain a visual image.

However, scanning the scene at a non-linear velocity causes the pixel aspect ratio of the resultant image to be distorted, and to vary throughout the image. To compensate for this, the digital image data are corrected to remove the effects of the non-linear scanning velocity. Once corrected, a distortion free visual image can be produced having a pixel aspect ratio of 1:1 throughout the entire image. Thus, the present invention provides improved electro-optical reconnaissance system performance by using a non-linear scanning velocity that takes advantage of increased near field resolution, and by then electronically correcting the resultant image data to remove the effects of the non-linear scanning velocity.

Further features and advantages of the present invention, as well as the structure and operation of various embodiments of the present invention, are described in detail below with reference to the accompanying drawings. In the drawings, like reference numbers indicate identical or functionally similar elements. Additionally, the left-most digit of a reference number identifies the drawing in which the reference number first appears.

BRIEF DESCRIPTION OF THE DRAWINGS

The present invention will be described with reference to the accompanying drawings, wherein.

DETAILED DESCRIPTION OF THE INVENTION

Table of Contents

Figure 1:
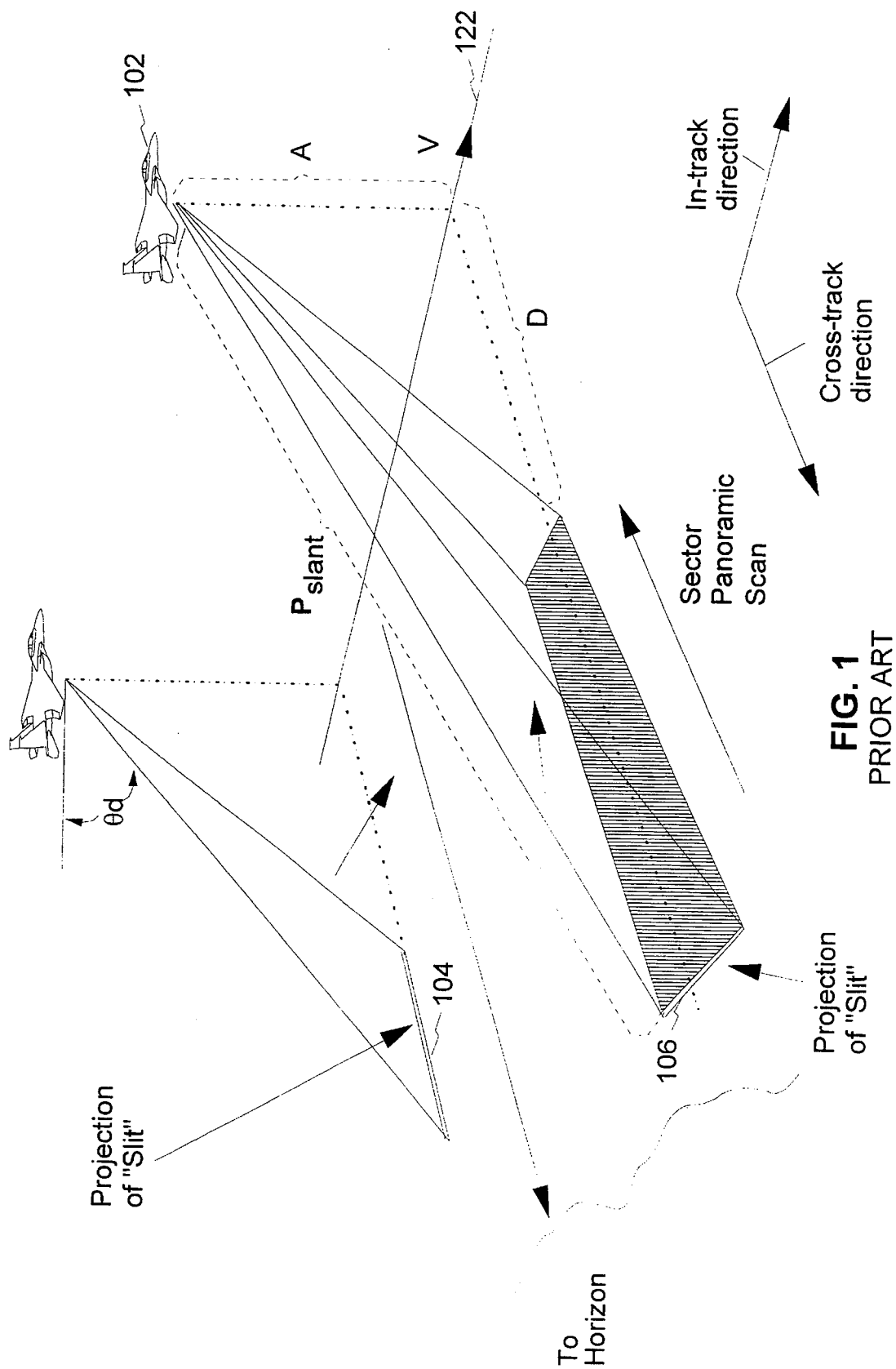
FIG. 1 is a diagram illustrating sector-scan electro-optical reconnaissance system.
Figure 2:
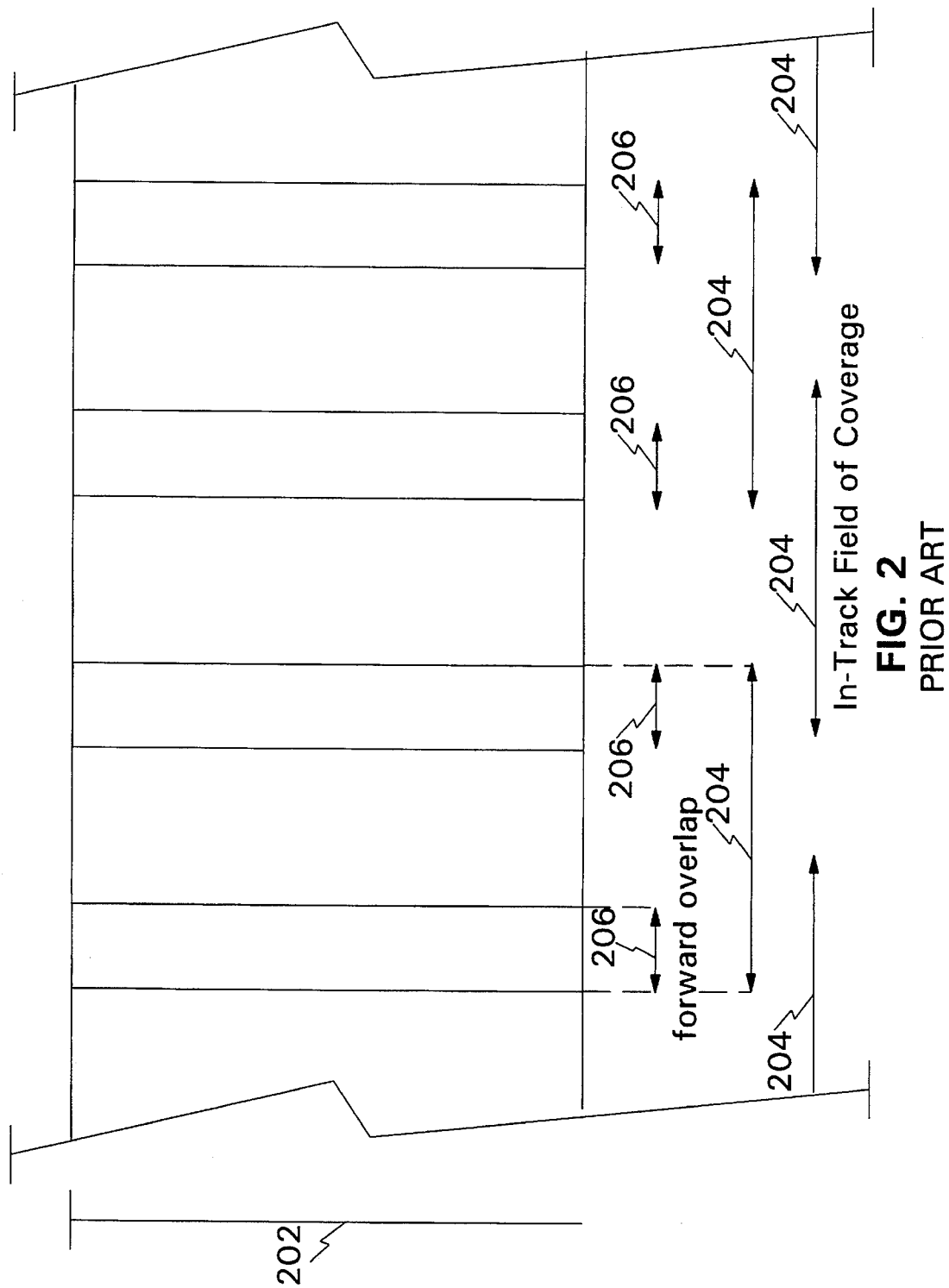
FIG. 2 illustrates photographic slices 106 from a sector-scan electro-optical reconnaissance system.

1. Overview of the Invention
2. Terminology
3. The Invention and Its Environment
4. Non-Linear Scanning
5. Embodiments of the Invention
5.1 Assumptions and Key System Parameters
5.2 Determination of Scan Rate (Scan Velocity) and Line Rate 5.2.1 Exact Solution Scan Equations for Modes 1, 4, and 5
5.2.2 Polynomial Approximation Scan Equations for Modes 1, 4, and 5
5.2.3 Exact Solution Scan Equations for Modes 2 and 3
5.2.4 Polynomial Approximation for Modes 2 and 3
5.3 Pixel Aspect Ration Correction Procedure
5.3.1 Derivation
5.3.2 Implementation
6. Image Interpretability Rating Scale (IIRS)
7. Conclusion 1. Overview of the Invention The present invention is a system and method for non-linear scanning in electro-optical reconnaissance systems to allow an increased maximum operational aircraft velocity for a specified level of system resolution and forward overlap. The present invention takes advantage of increases in near-field resolution by increasing the scan velocity in the near field while maintaining a given FPA read rate (typically the maximum rate). Thus the overall scan velocity is increased without sacrificing system resolution. Since the overall scan velocity is increased, aircraft velocity V can be increased while maintaining a specified forward overlap.

With the FPA read rate held constant, as the scan velocity increases more area of the scene in the cross-track direction is imaged per FPA read. Because the scan velocity increases as the system scans the near field, a greater area of the scene is imaged between FPA reads at the near field, than at the far field. As a result, the angular aspect ratio of the pixels within a single image is not a constant 1:1. Thus, the resultant image is distorted. The image is elongated in the cross-track direction (with respect to the in-track direction). The amount of elongation increases (in the near field) as the scan velocity increases. The pixels are actually elongated in the cross-track direction in that their angular dimension is larger. However, when the image is viewed it appears "squashed." The squashed appearance is more pronounced in the near field.

To provide a final product image having pixels with an angular aspect ratio of 1:1 (i.e., distortion free) everywhere within the image, the image is corrected during image processing.

Thus the present invention provides improved electro-optical-LOROP system performance by performing a non-linear scan to take advantage of increased near-field resolution, and by electronically correcting the image dam to correct for the non-linear scan rate.

2. Terminology

Table 1, below, outlines the definitions of terminology and symbols used in this application. The terms in Table 1 are ordered so that each is defined only in terms of those terms that have already been defined in the table.

Some of the terms listed in Table 1 have been previously defined in this application. The definition of these terms is repeated in Table 1.

In this application, the terms 'scan rate' and 'scan velocity' are used interchangeably. These terms refer to the angular velocity at which the camera is scanned.

TABLE 1

| Term | Symbol | Definition |
|---|---|---|
| velocity | V | Velocity of the aircraft relative to the ground (nmile/hour). |
| height | H | Altitude of the aircraft above the ground (feet). |
| in track | N/A | Parallel to the direction of the flight of the aircraft. |
| cross track | N/A | Perpendicular to the direction of the flight of the aircraft. |
| depression angle | $\theta_d$ | The angle measured from the horizontal at which the camera is pointed in the cross-track direction. |
| minimum depression angle | $\theta_{dmin}$ | The minimum depression angle that occurs during a given scan of an image. |
| maximum depression angle | $\theta_{dmax}$ | The maximum depression angle that occurs during a given scan of an image. |
| slant range | $\rho_{slant}$ | The distance from the aircraft to the point on the ground at which the camera is currently pointing. |
| ground range | $\rho_{ground}$ | The distance from the point directly below the aircraft on the ground to the point on the ground at which the camera is currently pointing. |
| scan velocity | $\omega$ | Angular velocity (radians/sec) at which the camera scans the ground in the cross-track direction = $\frac{\partial \theta_d}{\partial t}$. |
| in-track gsd | $i_{GSD}$ | The distance (feet) at the ground perpendicular to the line of sight in the in-track direction represented by a scanned pixel. |
| cross-track gsd | $x_{GSD}$ | The distance (feet) at the ground perpendicular to the line of sight in the cross-track direction represented by a scanned pixel. |
| ground sample distance | GSD | $GSD^2 = i_{GSD} * x_{GSD}$ Where $i_{GSD}$ and $x_{GSD}$ differ by more than a factor of 2, GSD is limited to the greater of the two divided by 2½. |
| cycle time | $t_c$ | The time (seconds) between the start of one scan and the start of the next scan. |
| minimum cycle time | $t_{cmin}$ | The minimum time (seconds) allowed between the start of one scan and the start of the next scan. |
| scan time | $t_s$ | the time (seconds) actually available for scanning an image during the cycle time. |
| dead time | $t_d$ | The time (seconds) not available for scanning an image during the cycle time. |
| scan time used | $t_{sused}$ | The scan time (seconds) actually used for scanning an image; an integral number of 1 millisecond intervals. |
| line rate | lr | The (variable) rate at which lines of pixels are generated by the camera system. |
| maximum line | $lr_{max}$ | The maximum rate at which lines |

TABLE 1-continued

| Term | Symbol | Definition |
|---|---|---|
| rate | | of pixels can be generated by the camera system. |
| minimum line rate | $lr_{min}$ | The minimum rate at which lines of pixels can be generated by the camera system. |
| low-light setting | $\gamma_s$ | If "off", normal camera operation. If "on", low-light conditions exist; calculated line rate lr and maximum line rate $lr_{max}$ are affected. |
| exposure control | $E_c$ | A power of two (may be <1) by which the calculated line rate should be multiplied to compensate for too much or not enough light. |
| forward scan | $\theta_{dmax}-\theta_{dmin}$ | A scan which begins at $\theta_{max}$ and ends at $\theta_{dmin}$. |
| reverse scan | $\theta_{dmin}-\theta d_{max}$ | A scan which begins at $\theta$dmin and ends at $\Theta d_{max}$. |
| overlap | ov | The amount (fraction of 1.0) by which consecutive scanned images must overlap on the ground at $\theta_{dmax}$; a function of camera mode. |
| in-track coverage | $i_{cov}$ | The total angle scanned in the in-track direction; same for all camera modes. |
| cross-track coverage | $x_{cov}$ | The total angle scanned in the cross-track direction; fixed for camera modes 1, 4, and 5; variable for modes 2 and 3. |
| focal length | f | Focal length (inches) of the camera system. |
| number of detector elements | $n_{det}$ | the number of detector elements in the linear detector array, including a "space" for two non-existent detectors in the middle of the array. |
| detector width | $w_{det}$ | The width (mm) of a single detector element in the pixel (in-track) direction. |
| detector angle | $\theta_{det}$ | The angle in the pixel (in-track) direction "seen" by a detector element at the middle of the detector array. |
| desired linear line angle | $\theta_{dll}$ | The desired angle in the line (cross-track) direction "seen" by a detector element for a linear scan; $\theta_{dll} = \theta_{det}$ for modes 1, 2, 3 and 5, and $\theta_{dll} = \theta_{det}/2$ for mode 4. |
| number of lines | $n_{lines}$ | The number of image lines generated during a scan. |
| full resolution image line number | $l_{full}$ | The line number (zero relative) of a line in the full resolution image collected during a scan. |
| full resolution line group | $n_{lg}$ | The number of full resolution lines corresponding to a given line in the minified view image. |
| cutoff depression angle | $\theta_{dcutoff}$ | The depression angle at which we switch from constant $x_{GSD}$ to variable $x_{GSD}$ during a mode 2 or mode 3 scan. |
| cuttoff time | $t_{cutoff}$ | The time corresponding to $\theta_{dcutoff}$ at which we switch from constant $x_{GSD}$ to variable $x_{GSD}$ during a mode 2 or mode 3 scan. |
| end-of-frame time | $t_{end}$ | The time elapsed after the last complete image line has been generated during the scan. |
| minified view size | $n_{minif}$ | The dimension in pixels of the $n_{minif} \times n_{minif}$ pixel buffer used to store minified view images. |
| minified view image line number | $l_{minif}$ | The line number (zero relative) of a line in the minified view image. |
| minified view | $n_{avg}$ | Each $n_{avg}$ by $n_{avg}$ block of pixels |
| averaging factor | | in a full resolution image collected with a constant angular scan velocity will be averaged to form one pixel in the minified view image. |
| line group angle | $\Delta\theta_{minif}$ | The angle "seen" by a pixel in the minified view image. |

3. The Invention and its Environment

The present invention was developed for use with the F-979H long-range tactical electro-optical sensor system, developed by Loral Fairchild Systems, Syosset, N.Y. This sensor system can be mounted in a variety of aircraft or in a reconnaissance pod or other such airborne craft. The core of this system is a Systems Imaging Sensor, comprising an imaging LRU (line replaceable unit) and three electronics LRUs. Additional equipment may include a reconnaissance management unit interfacing with the aircraft, a control panel, optical sights, and an in-flight data recorder. A ground data system, referred to as an EO-LOROPS ground station, is used to process the image data in real time, provide visual displays of the image data, record digital data on recorders, and record visual images on film.

Figure 4:
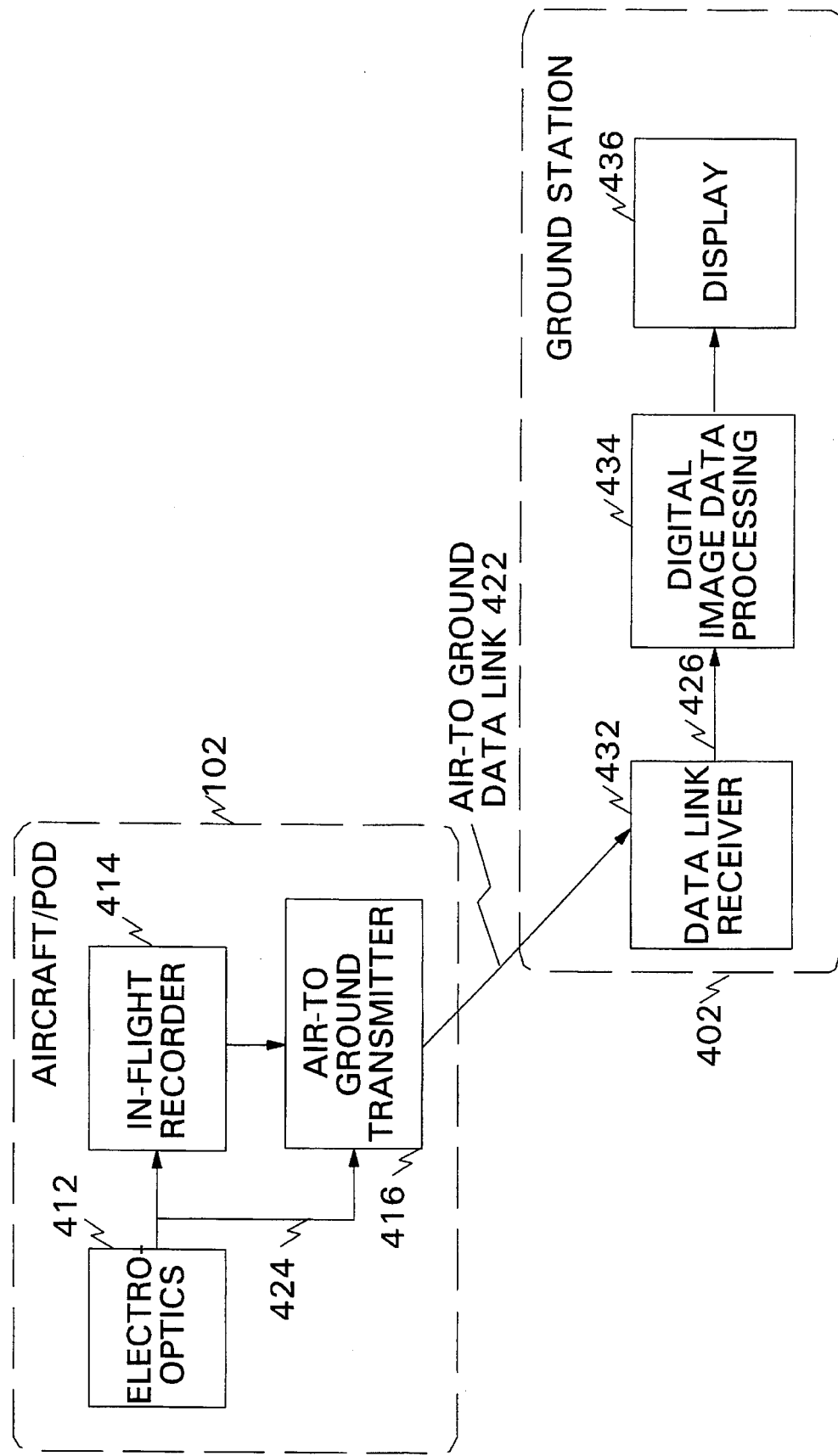
FIG. 4 is a high level block diagram illustrating key elements of the present invention and its environment.

FIG. 4 is a high-level block diagram illustrating a representative environment of the present invention. Typical airborne components according to the present invention can be mounted within aircraft 102, or within a reconnaissance pod. The airborne segment comprises electro-optics components 412, in-flight recorders 414, and an air-to-ground transmitter 416. In one embodiment, air-to-ground transmitter 416 is not used. Data are stored on board the aircraft and delivered to the ground station.

Electro-optics components 412 comprise an FPA, optics, focus and exposure control, optional data compression, computer hardware and software, and processing electronics. Electro-optics components receive optical information of the scene scanned and provide an electronic signal 424 representing the optical scene. Electronic signal 424 is recorded using an optional in-flight recorder 414.

Air-to-ground transmitter 416 is used for transmitting scanned image information from aircraft 102 to a ground station 402. Such transmission is accomplished by a air-m-ground data link 422. Details of blocks 412–416 will be described below in conjunction with FIG. 7.

Ground station 402 comprises a data link receiver 432, digital image data processing 434, and a display 436. Data link receiver 432 receives image data on a carrier via air-to-ground data link 422, removes the carrier, and forwards the remaining digital image data for processing via an electronic signal 426. Optionally, the digital image data are recorded at the output of receiver 432. Such recording is performed for archival purposes or for post real-time (off-line) processing.

Digital image data processing 434 can be configured to provide a plurality of data processing functions. The overall goal of digital image data processing is to convert digital image data into a useable visual image.

An alternative environment can be considered wherein digital image processing is performed in the aircraft/pod as opposed to in ground station 402. An additional alternative environment can be considered wherein electronic signal is not transmitted via air-to-ground data link 422, but is instead recorded on transportable media. In the environment, electronic signal 424 is retrieved from the media and processed subsequent to the flight operation. These alternatives obviate the need for an air-to-ground data link and its associated hardware.

4. Non-Linear Scanning

LOROP system performance is often specified in terms of an image Interpretability Rating Scale (IIRS) value. The IIRS value is a quantitative, though partly subjective, measure of image quality. It is a function of slant range $\rho_{slant}$, altitude A, system resolution, atmospheric visibility, and solar illumination. A particular IIRS value is typically defined as a range of ground resolved distances (GRD) at a given slant range R anywhere within a given frame. Typical IIRS rating values and their associated GRD are listed in Section 6.0 of this document.

GRD is defined as the minimum test target element resolved on the ground. Generally the system has to sample the ground at two times the GRD. Thus, the ground sample distance is

GRD=2*GSD

In other words, the ground must be sampled every 0.5 feet to resolve a target the size of 1 foot under worst-case conditions.

To meet a given IIRS value, it may be assumed that the scan velocity of the camera is limited to a rate at which the camera traverses the distance of only one IIRS-specified GSD between each FPA read cycle. In other words, for vertical resolution to meet an IIRS requirement, the information in the FPA must be read each time the vertical scan causes the FPA to traverse a vertical distance of one-half the IIRS-specified ground resolved distance. As the vertical scan velocity increases, the rate at which the information in the FPA is read must increase as well. Because the rate a which the information in the FPA may be read is limited by detector technologies, the vertical scan velocity is limited to a practical maximum rate.

Since vertical scan velocity reaches a practical maximum, and since an increase in vertical scan velocity is required to maintain forward overlap 206 as airplane 102 velocity V increases, velocity V is limited to a maximum.

The area of the scene detected by each pixel (i.e., the area projected by each pixel) of the FPA at any given instant is defined as the sample size. As noted above, the EO camera is scanned such that the projection of each pixel is swept across the scene in the cross-track direction. This scanning causes the scene to be imaged in strips as discussed above.

As the camera is scanned, a scene image is focused onto the FPA. The FPA transforms this scene image into an electrical charge representation of the optical information. FPAs are well known to those of ordinary skill in the art. The electrical charge information in the FPA is read out periodically during an FPA read in a conventional manner.

In a preferred embodiment the scene image is optical information in the visible spectrum (i.e., light). Other embodiments may be contemplated wherein the scene energy detected is of an alternative wavelength such as infrared. It will be obvious to one of ordinary skill in the art how to select detector technology, optical components, and filters to optimize system performance for the desired operational wavelength.

The area covered by the swept projected change in angle (related to the ground) between FPA reads is called the ground sample distance (GSD). Thus each strip comprises several GSDs. GSD is a function of pixel size, the focal length of the system, the scan velocity of the camera, and the slant range As the slant range $\rho_{slant}$ decreases, the GSD also decreases. Therefore, as slant range $\rho_{slant}$ decreases, resolution increases. As a result, the GRD for a given scan velocity and FPA read rate decreases as well.

The slant range $\rho_{slant}$ between the aircraft and the sample decreases as the scan is made from the far-field point of scan to the near-field point of scan. However, there is no requirement for improved resolution (beyond the specified GRD) in the near-field scan. To assure performance at a given IIRS across the entire cross-track field of coverage 202, the specified GRD for a desired IIRS must be met at the worst-case point, which is the far-field point of scan. The improved resolution at the near-field point of scan yields a better IIRS value, but this is of no practical benefit when the specified IIRS value has already been met.

The present invention, however, takes advantage of this increased near-field resolution performance to overcome the problem in conventional systems of limiting the scan rate. Since the GSD decreases in the near field, the camera can be scanned faster (at a given FPA read rate) to cover the same amount of GSD in the near field as was covered in the far field at the slower scanning rate.

Faster scanning in the near field increases the overall scanning rate of the camera. As a result, for a given IIRS requirement and a given FPA read rate, the velocity V of the aircraft (and the amount of cross-track coverage) can exceed that to which it was limited with conventional systems.

5. Embodiments of the Invention

Figure 3:
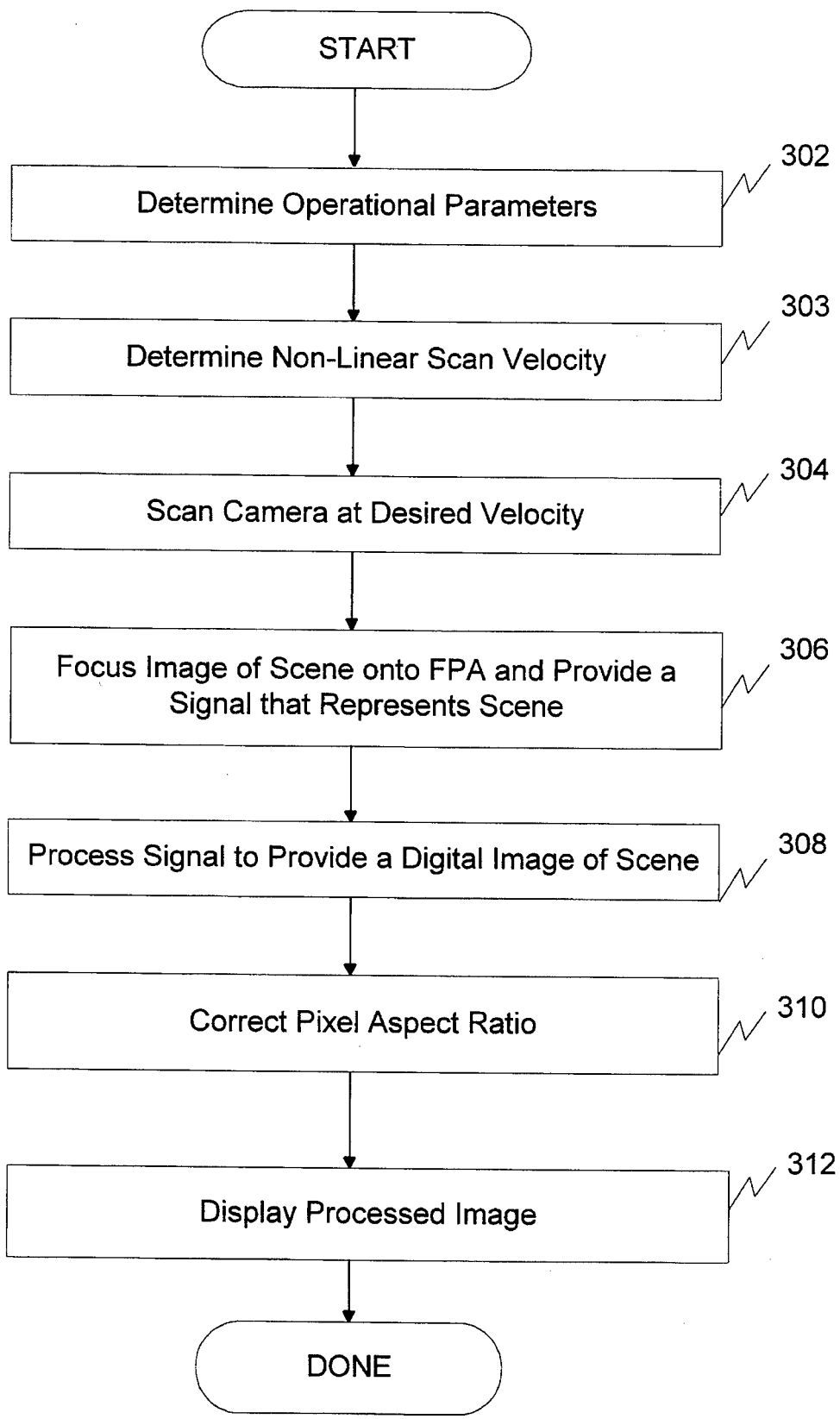
FIG. 3 is a flow chart illustrating a method according to the present invention.
Figure 7:
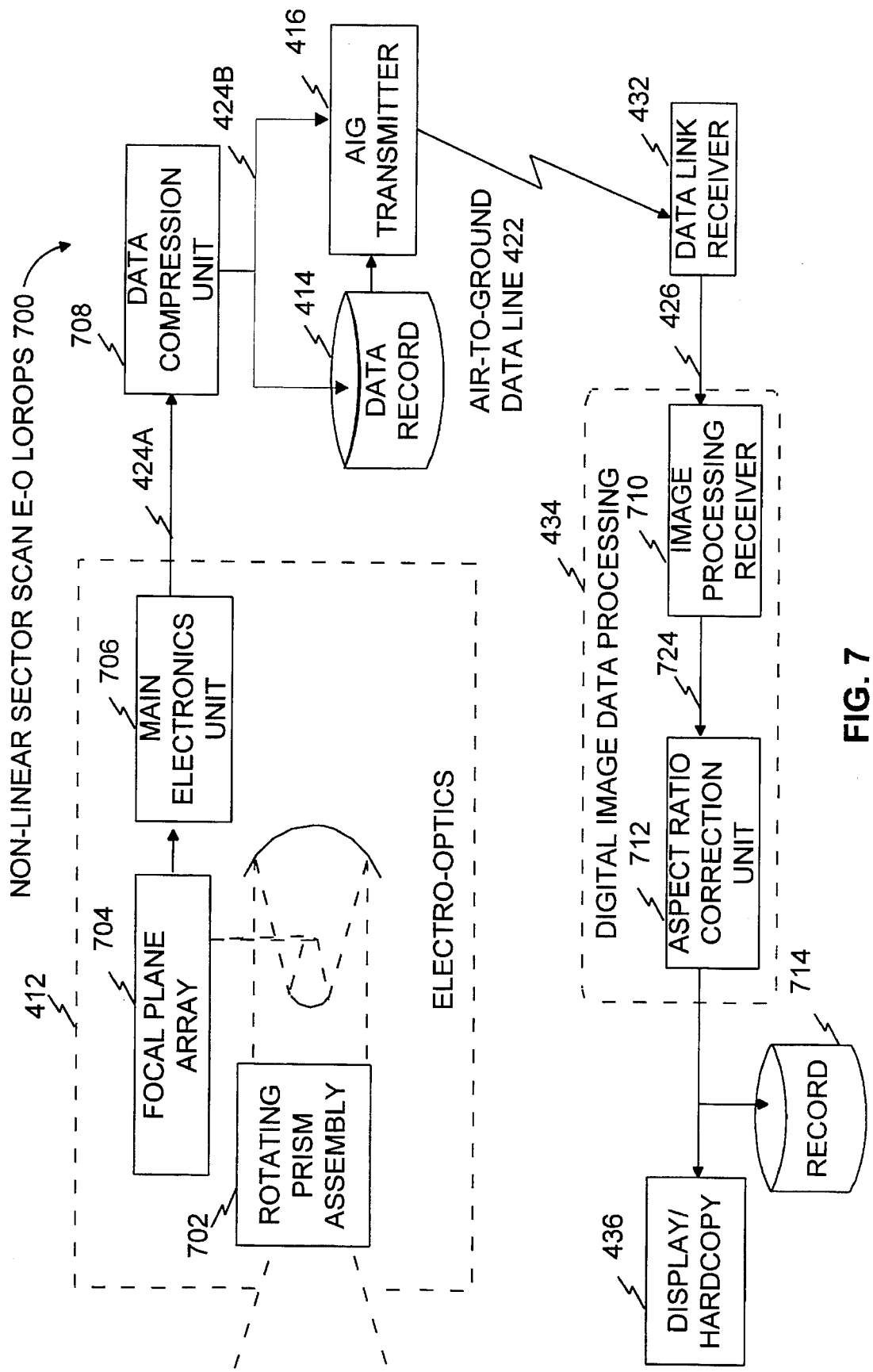
FIG. 7 is a block diagram illustrating elements of the present invention.

As discussed above, the present invention relies on what would otherwise be increased resolution in the near field to allow the scan velocity of the camera to be increased as the scan moves into the near field. According to the present invention, imagery data collected using an increasing scan velocity (non-linear scanning), is corrected on the ground to remove the geometric effects of such non-linear scanning. FIG. 3 is a flow chart illustrating a preferred process according to the present invention. FIG. 7 is a block diagram illustrating a preferred system according to the present invention. The present invention will now be described with respect to FIG. 3 and FIG. 7.

In a step 302, calculations are performed to determine system operating parameters such as camera scan rate and FPA read rates for a desired IIRS and given operational parameters such as aircraft velocity V. These calculations are performed with no restrictions on scanning rate. An associated FPA read rate, required to meet performance specifications (particularly resolution) at the determined scan rate, is calculated. For faster camera scan rates, the FPA read rate must also be faster. At camera scan rates above a certain value, the FPA must be read at a rate faster than the detector technology permits. This scan rate is called the 'threshold' rate.

If the required FPA read rate is within system capabilities, the camera scan velocity can be constant throughout the scan. If, on the other hand, the desired FPA read rate is faster than the system can handle, the scan velocity must be varied as a function of time. In other words, to obtain scan velocities above threshold, non linear scanning will be used, thereby increasing the scan velocity as the camera scans the near-field.

In a step 303, if the scan rate is above the threshold rate, a non-linear scan velocity is determined.

In a step 304, the camera is scanned across the scene to be imaged at the scan velocity as determined in step 302 (below threshold) or in step 303 (above threshold). Camera scanning can be accomplished using a rotating prism assembly 702, a movable camera mount, a rotating camera barrel, or a number of other scanning techniques. These techniques for scanning a camera across a scene are well known to those of ordinary skill in the art.

In a step 306, as the camera is scanned across the scene, an image of the scene is focused on an FPA 704 of the system. FPA 704 converts the image (visual, infrared, electromagnetic, or the like) into electrical charge information 722. Electrical charge information 722 is processed by a main electronics unit 706 to provide a physical electronic signal 424A that represents the image information focused onto the FPA. In other words, in step 306, the camera electronically 'photographs' the scene.

Optimal data compression can be performed by data compression unit 708 to compress the digital image data in electronic signal 424A. Data compression generates signal 424B.

The image data are transmitted to the ground for processing as discussed above with reference to FIG. 4. If dam compression was used the data must be decompressed after reception.

As a result, the digital image data in electronic signal 424A is provided in electronic signal 426.

In a step 308, digital image dam in electronic signal 426 is processed in image processing unit 710 to provide an image of the scene as 'photographed' by the camera. This processing involves converting the digital image information in electronic signal 426 into a visual image data signal 724 that can be displayed on a monitor or other device, or provided on hard copy.

In a step 310, the pixel aspect ratio of visual image data signal 724 is corrected by aspect ratio correction unit 712 to compensate for the effects of non-linear scanning. Pixel aspect ratio is the ratio of width to height.

In a step 312, the image processed in step 308 is displayed on a monitor or other device 436, printed out in hard copy, or stored in a data base 714 for later retrieval.

above discussion with reference to FIG. 3, provides a high-level discussion of the key steps of the present invention. Steps 302, 303 and 308 are crucial to successful operation according to the present invention. These steps are described in greater detail in the subsections that follow.

In steps 302 and 303 discussed above, the system and method according to the present invention determine the scan velocity desired. To meet performance objectives, the EO camera system according to the present invention collects its image data in such way that the angular aspect ratio of the pixels within a single image is not a constant 1:1, but is variable (i.e., the scan velocity is non-linear). This results in an image which is distorted. However, it is desirable to provide a distortion-free final image with pixels whose angular aspect ratio is 1:1 everywhere within the image. According to the present invention, this is accomplished in step 308 by correcting the variable pixel aspect ratio in the EO-LOROPS Ground Exploitation System (GES).

To perform this correction fast enough to keep up with the incoming data flow, the correction should remain computationally simple. However, the camera system angular scan velocity equations are typically relatively complex. To simplify the computations required, the camera scan equations are accurately approximated using a quadratic polynomial in depression angle. This allows the system to meet its performance objectives while at the same time yielding a computationally simple pixel aspect ratio correction procedure.

The following subsections of this application describe in greater detail the scan velocity determination of steps 302 and 303 and the pixel aspect ratio correction of step 308.

Subsection 5.1 of this application presents the assumptions used in determining the scan velocity and the image correction relationships. Subsection 5.1 also discusses key system parameters. Subsection 5.2 of the application describes the equations for the exact angular scan velocity desired for each of the five modes, and the procedure used to approximate them with a quadratic polynomial in depression angle. Subsection 5.3 describes the procedure used to perform fast pixel aspect ratio correction.

5.1 Assumptions and Key System Parameters

Certain assumptions can be made to simplify the computations required. Described in this section is a list of the assumptions used in a preferred embodiment of the present invention.

The first assumption used is that the earth is flat. This assumption greatly simplifies the scan velocity equations, and hence the correction equations.

The second assumption is that there is no cross wind. This allows the assumption that the plane's motion is totally in the in-track direction and there is no motion component in the cross-track direction. In other words, the second assumption is that there is no crab angle.

The third assumption is that the aircraft is standing still for the duration of each scan.

The fourth assumption is that for very small angles the value of the angle (radians) may be used instead of the sine of the angle. This fourth assumption is no more than a frequently used mathematical approximation.

The final assumption is that the depression angle supplied when specifying a scan is always the maximum depression angle for the scan.

The EO-LOROP camera system according to the present invention is capable of collecting imagery using five different modes over a wide performance envelope of aircraft velocity, altitude, and depression angle. Tables 2 and 3 list representative system parameters for an embodiment of the present invention.

TABLE 2

| Parameter Name | Parameter Symbol | Minimum Value | Maximum Value |
|---|---|---|---|
| velocity | V | 350 nmile/hour | 750 nmile/hour |
| altitude | H | 10,000 feet | 40,000 feet |
| depression angle | $\theta_d$ | 4° | 30° |
| ground range | $r_{ground}$ | 5 nmile | 40 nmile |

TABLE 3

| Parameter Name | Parameter Symbol | Value |
|---|---|---|
| dead time | $t_d$ | 0.4 second |
| minimum cycle time | $t_{cmin}$ | 0.78 second |
| maximum line rate | $lr_{max}$ | 2500 lines/second |
| minimum line rate | $lr_{min}$ | 400 lines/second |
| focal length | f | 66 inches |
| detector width | $w_{det}$ | 0.01 mm |
| number of detectors | $n_{det}$ | 12,002 |
| minified view size | $n_{minif}$ | 4096 pixels |
| in-track coverage | $i_{cov}$ | 4.100277° |
| detector angle | $\theta_{det}$ | $5.96516 * 10^{-6}$ radians |

The equations below are equations for the camera parameters given above which are calculated as opposed to given:

$$i_{cov} = 2*\arctan\left(\frac{\frac{n_{det}}{2} * \frac{w_{det}}{25.4 \text{ mm/in}}}{f}\right)$$

$$\theta_{det} = \frac{\frac{w_{det}}{25.4 \text{ mm/in}}}{f}$$

As noted, the present invention is described in terms of five modes. The five modes specified each have different parameters as listed in Table 4, below. Additional modes may be contemplated wherein alternative system parameters are specified.

TABLE 4

| Mode | Cross-Track Coverage $x_{cov}$ | Line Rate lr | Overlap | Ground Sample Distance GSD |
| --- | --- | --- | --- | --- |
| 1 | 8.0° | variable | 0.12 | variable |
| 2 | variable | $lr_{max}$ | 0.12 | 1.5 feet (18 in.) |
| 3 | variable | $lr_{max}$ | 0.12 | 1.83 feet (22 in.) |
| 4 | 4.0° | variable | 0.12 | variable |
| 5 | 4.0° | variable | 0.56 | variable |

5.2 Determination of Scan Velocity and Line Rate

Figure 5:
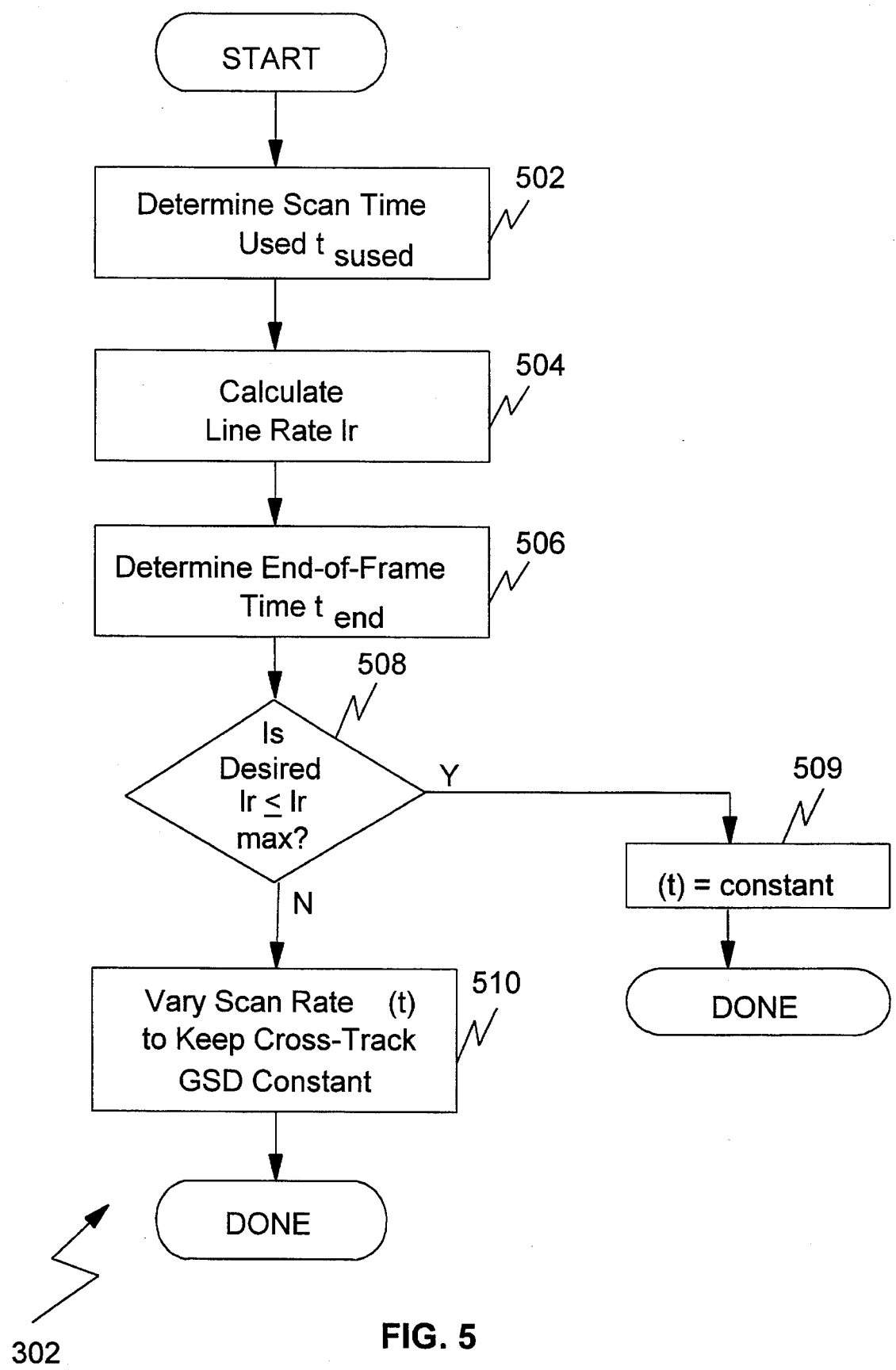
FIG. 5 is a flow chart illustrating the steps involved with determining the desired scan velocity.

As outlined above, the desired scan velocity and the non-linear scan velocity are determined in steps 302 and 303, respectively. Steps 302 and 303 will be discussed in this section in more detail with reference to FIG. 5.

In a step 502, the actual scan time used $t_{sused}$ is determined. Scan time used $t_{sused}$ is the amount of time in seconds during each scan cycle that the system actually scans the scene. Scan time used is a fraction of the scan time $t_s$ available for scanning the scene during the scan cycle.

In a step 504, the system line rate lr is determined and the number of lines in the scan is calculated. System line rate lr is the rate at which lines of pixels are generated by the camera system. System line rate lr is a function of the mode selected.

In a step 506, and end of frame time $t_{end}$ is determined. End of frame time $t_{end}$ is the time elapsed after the last complete image line has been generated during the scan.

In a step 508, if the lipe rate lr is less than or equal to the maximum line rate $lr_{max}$, a constant scan velocity is used (step 509). If however, the line rate lr exceeds the maximum line rate $lr_{max}$, a non-linear scan velocity must be computed in a step 510 and the scan velocity can be increased during the scan, keeping $X_{GSD}$ constant.

Figure 6:
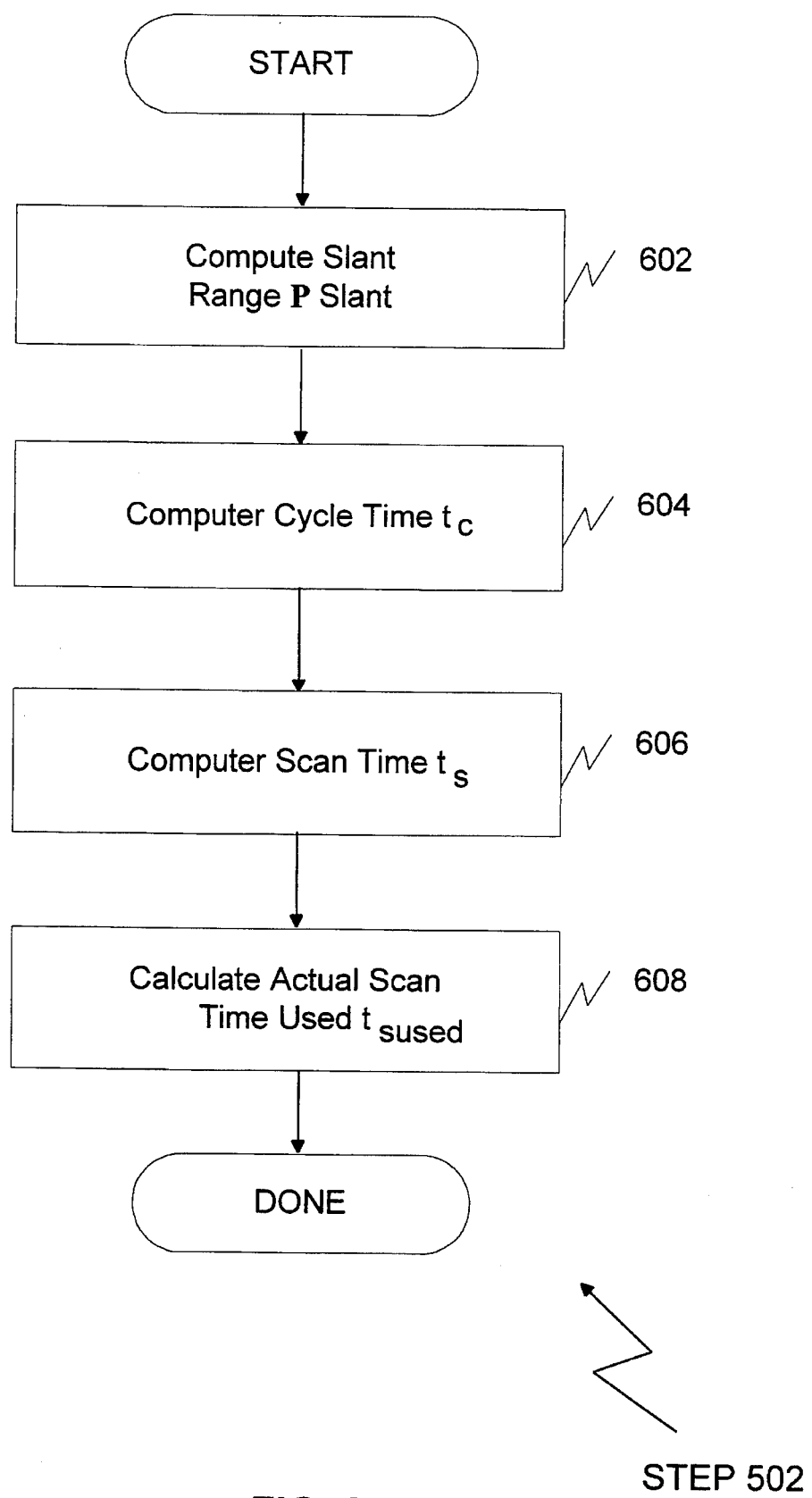
FIG. 6 is a flow chart illustrating the steps required to determine a scan time used.

FIG. 6 is a flow chart illustrating the steps followed in determining the scan time used $t_{sused}$ in step 502. Referring to FIG. 6, in a step 602, slant rage $\rho_{slant}$ is determined as:

$$\rho_{slant} = \frac{H}{\sin(\theta_{dmax})}$$

In a step 604, the cycle time $t_c$ is computed. To compute cycle time, the in-track distance at the near field is calculated. At depression angle $\theta_{dmax}$ (near-field) the camera images an in-track distance equal to:

$$\frac{\left(2*\tan\left(\frac{i_{cov}}{2}\right)*\rho_{slant}\right)}{v*\frac{6076 \text{ ft/nmile}}{3600 \text{ sec/hr}}}$$

The cycle time is simply chosen as the time it takes the aircraft to travel a fraction of this in-track distance. A fraction of this distance is used (as opposed to the entire distance) to provide forward overlap. If the cycle time $t_c$ is quicker than the time it takes to cover the in-track distance, the scanned strips will overlap. The fraction used is defined by (1-ov) where ov is a number less than 1 indicating the amount by which the images must overlap. For example ov=0.12 provides a 12% overlap. Thus, the cycle time can be described as:

$$t_c = (1-ov)*\frac{\left(2*\tan\left(\frac{i_{cov}}{2}\right)*r_{slant}\right)}{v*\frac{6076 \text{ ft/nmile}}{3600 \text{ sec/hr}}}$$

In practical applications, there is a lower bound $t_{cmin}$ on the cycle time $t_c$ due to the fact that the camera scanning mechanism has a maximum rotational velocity. Therefore, the computed value of $t_c$ must be compared to the lower bound $t_{cmin}$. If $t_c < t_{cmin}$ the desired overlap is sacrificed to achieve a reasonable cycle time using the following procedure:

if ov>0.12, set ov=0.12 and repeat the calculation.

If $t_c$ is still>$t_{cmin}$, or if ov>+0.12 initially, set $t_c=t_{cmin}$.

The actual overlap achieved can then be calculated from the cycle time by rearranging the above equation to solve for ov.

In a step 606, the scan time is calculated. Given the cycle time $t_c$ the scan time available $t_s$ is then calculated as:

$$t_s = t_c - t_d$$

In a step 608, the actual scan time used $t_{sused}$ is calculated as:

$$t_{sused} = \frac{\text{truncate\_to\_integer}(t_s * 1000 \text{ msec/sec})}{1000 \text{ msec/sec}}$$

The scan time used is truncated to an integral number of milliseconds, in a preferred embodiment, the airborne system will update the camera scan velocity at 1 millisecond intervals. Alternative embodiments may be considered wherein the airborne system updates the camera scan velocity at other periodic or nonperiodic intervals.

Once the scan time $t_{sused}$ is determined in step 502, the line rate and the number of lines in the scan can be calculated in step 504. For modes 2 and 3 the line rate is always $lr_{max}$, and the number of image lines in the scan will be $$n_{lines} = \text{truncate\_to\_integer}(t_{sused}*lr)$$

For modes 1, 4, and 5 it is desired to produce lines whose cross-track angle is $\Theta_{dll}$ that will fit into the cross-track coverage $x_{cov}$, rounded to an integer:

$$n_{lines} = \text{truncate\_to\_integer}\left(\frac{x_{cov}}{\theta_{dll}} + 0.5\right)$$

The line rate lr is next calculated so that $n_{lines}$ lines will be produced, such that:

$$lr = \frac{n_{lines}}{t_{sused}}$$

If the line rate calculated exceeds $lr_{max}$ the line rate must be limited to $lr_{max}$, and the scan velocity varied non-linearly, such that:

$$lr = \min(lr, lr_{max}).$$

The number of lines generated during the scan is therefore:

$$n_{lines} = \text{truncate\_to\_integer}(lr * t_{sused})$$

The answer is truncated to an integer, discarding any partial line.

The end-of-frame time determined in step 506 is therefore:

$$t_{end} = \frac{n_{lines}}{lr}$$

The non-linear scan velocity determined in step 510 can be determined using an exact solution or a polynomial approximation. These determinations are discussed in the subsections that follow. Subsection 5.2.1 describes exact solution scan equations for Modes 1, 4 and 5. Subsection 5.2.2 describes polynomial approximation scan equations for Modes 1, 4, and 5. Subsections 5.2.3 and 5.2.4 describe exact solution and polynomial approximation scan equations, respectively, for modes 2 and 3.

5.2.1 Exact Solution Scan Equations for Modes 1, 4, and 5

This section presents the exact solution for the modes 1, 4, and 5 angular scan velocity.

If the desired line rate as calculated in Section 4 is less than or equal to $lr_{max}$, the angular scan velocity of the camera is a constant throughout the scan and is given by:

$$\omega(t) = \theta_{dll} * lr.$$

Scanning at this constant angular scan velocity will generate pixels with the desired constant angular aspect ratio. $\theta_{dmin}$ can be precisely calculated as $$\theta_{dmin} = \theta_{dmax} - \theta_{dll} * n_{lines}.$$

As illustrated by step 508, if the desired line rate exceeds $lr_{max}$, the angular scan velocity of the camera will vary with time, and the pixels produced will have variable angular aspect ratios which will have to be corrected by the GES.

To see how this will be done, it is helpful to first examine in detail the three key equations that define in-track GSD, $i_{GSD}$, cross-track GSD, $X_{GSD}$, and GSD:

$$i_{GSD} = h * \frac{\theta_{det}}{\sin(\theta_d)}$$

$$x_{GSD} = \frac{h * \frac{\partial \theta_d}{\partial t} * \frac{1}{lr}}{\sin(\theta_d)}$$

$$GSD^2 = i_{GSD} * x_{GSD}.$$

For good performance over the entire scan (in terms of GSD), some resolution in the near field is sacrificed to obtain better resolution in the far field. To accomplish this, the scan velocity is varied in such a way as to keep $X_{GSD}$ constant:

$$x_{GSD} = \frac{h * \frac{\partial \theta_d}{\partial t} * \frac{1}{lr}}{\sin(\theta_d)} = \frac{-h}{2 * lr * t_{sused}} * \ln\left(\frac{1 - \cos(\theta_{dmin})}{1 + \cos(\theta_{dmin})} * \frac{1 + \cos(\theta_{dmax})}{1 - \cos(\theta_{dmax})}\right)$$

Solving this equation for $\partial\theta d/\partial t$ yields an angular scan velocity of:

$$\omega(t) = \frac{\partial \theta_d}{\partial t} = \frac{-\ln\left(\frac{1 - \cos(\theta_{dmin})}{1 + \cos(\theta_{smin})} * \frac{1 + \cos(\theta_{dmax})}{1 - \cos(\theta_{dmax})}\right)}{2 * t_{sused}} * \sin(\theta_d)$$

which simplifies to:

$$\omega(t) = \frac{\partial \theta_d}{\partial t} = A * \sin(\theta_d)$$

solving for A yields:

$$A = \frac{-\ln\left(\frac{1 - \cos(\theta_{dmin})}{1 + \cos(\theta_{dmin})} * \frac{1 + \cos(\theta_{dmax})}{1 - \cos(\theta_{dmax})}\right)}{2 * t_{sused}}$$

Solving the above equation for $\theta_d$ as a function of time and then differentiating to get $\omega(t)$ yields:

$$-\frac{0.5 * (\ln(1 + \cos(\theta_d)) - \ln(1 - \cos(\theta_d)))}{A} = C - t$$

$$C = t - \frac{0.5 * (\ln(1 + \cos(\theta_d)) - \ln(1 - \cos(\theta_d)))}{A}$$

$$\theta_d(t) = \arccos\left(\frac{e^{-2*A*(C-t)} - 1}{e^{-2*A*(C-t)} + 1}\right)$$

$$\omega(t) = \frac{\partial \theta_d}{\partial t} = \frac{2 * A * e^{-A*(C-t)}}{(e^{-A*(C-t)})^2 + 1}$$

In the above equations the sign of time has been reversed so that it is always non-negative and the scan goes from $\theta_{max}$ to $\theta_{dmin}$ as t increases from 0. The constant of integration C can be easily computed by substituting $t = 0$ and $\theta_d = \theta_{dmax}$ into the equation for C. $\theta_{dmin}$ can then be precisely calculated by substituting $t_{end}$ into the equation for $\theta_d(t)$.

5.2.2 Polynomial Approximation Scan Equations for Modes 1, 4, and 5.

To find a quadratic polynomial approximation to the exact solution for the angular scan velocity of modes 1, 4, and 5, three equations with three unknowns are set up. The equations are solved for the coefficients. Note, it is desirable to obtain an approximation in which t begins at 0 and increases regardless of whether the scan is a forward ($\theta_{dmax}$ to $\theta_{dmin}$) or reverse ($\theta_{dmin}$ to $\theta_{dmax}$) scan. Therefore, in setting up the equations for a forward scan, time $t_{poly}$ is used in the approximate equations and $t_{exact}=t_{poly}$ in the exact equations. In setting up the equations for a reverse scan, $t_{poly}$ is used in the approximate equations and $t_{exact}=(t_{sused}-t_{poly})$ is used for the exact equations.

Three equations in three unknowns of the following form are desired:

$$\omega_{exact}(t_{exact})=a*t_{poly}^2+b*t_{poly}+c$$

Set $t_0=0$ and $\Delta t = t_{sused}$. Pick values of $t_{poly}=0$, $t_0+\Delta t/2$, and $t_0+\Delta t$; compute $t_{exact}$ as described above; set up the equations; and solve for a, b, and c. The result will be an approximate solution for w(t) of the form $$\omega_{poly}(t_{poly})=a*t_{poly}^2+b*t_{poly}+c$$

in which t begins at $t_0+\Delta t$ regardless of the scan direction.

This method can be generalized to include constant angular pixel aspect ratio images by setting: a=0, b=0, and $c=\theta_{all}*lr$.

5.2.3 Exact Solution Scan Equations for Modes 2 and 3.

This section presents the exact solutions for the modes 2 and 3 angular scan velocity.

Camera modes 2 and 3 collect imagery in such a way that the GSD is constant throughout the image. The line rate lr is always $lr_{max}$, the angular scan velocity of the camera will vary with time, and the pixels produced will have variable angular aspect ratios which will have to be corrected by the GES. To illustrate how this is accomplished, first examine in detail the three key equations that define in-track GSD $i_{GSD}$, cross-track GSD $X_{GSD}$, and GSD:

$$i_{GSD} = \frac{h*\theta_{det}}{\sin(\theta_d)}$$

$$x_{GSD} = \frac{h*\frac{\partial \theta_d}{\partial t}*\frac{1}{lr}}{\sin(\theta_d)}$$

$$i_{GSD}*x_{GSD} = GSD^2$$

To keep GSD constant throughout the scan $X_{GSD}$ can be varied to exactly compensate for changes in $i_{GSD}$. However, at large depression angles this would lead to very small values of $i_{GSD}$ and correspondingly large values of $X_{GSD}$. However, when $X_{GSD}$ gets very large a very small $i_{GSD}$ cannot be used to compensate. The system is therefore limited to the larger of $i_{GSD}$ and $x_{GSD}/2$. Thus, for large depression angles $x_{GSD}$ is held constant to maintain the desired GSD (see subsection 5.3 for the mode 2 and 3 values of GSD):

$$\sqrt{\frac{x_{GSD}}{2}}*x_{GSD} = GSD$$

$$x_{GSD}=\sqrt{2}*GSD=\frac{h*\frac{\partial \theta_d}{\partial t}*\frac{1}{lr}}{\sin(\theta_d)}$$

solving this equation for $\partial\theta_d/\partial t$ where:

$$\omega(t)=\frac{\partial\theta_d}{\partial t}=\frac{\sqrt{2}*GSD*lr}{h}*\sin(\theta_d)$$

yields:

$$\omega(t)=\frac{\partial\theta_d}{\partial t}=A*\sin(\theta_d) \text{ thus: } A=\frac{\sqrt{2}*GSD*lr}{h}$$

Note that this is the same basic form as the exact solution for modes 1, 4, and 5 with a different value for the constant A. Using the results from subsection 5.4 yields:

$$-\frac{0.5*(\ln(1+\cos(\theta_d))-\ln(1-\cos(\theta_d)))}{A}=C-t$$

$$C=t-\frac{0.5*(\ln(1+\cos(\theta_d))-\ln(-\cos(\theta_d)))}{A}$$

$$t=C+\frac{0.5*(\ln(1+\cos(\theta_d))-\ln(-\cos(\theta_d)))}{A}$$

$$\theta_d(t)=\arccos\left(\frac{e^{-2*A*(C-t)}-1}{e^{-2*A*(C-t)}+1}\right)$$

$$\omega(t)=\frac{\partial\theta_d}{\partial t}=2*A\frac{e^{-A*(C-t)}}{(e^{-A*(C-t)})^2+1}$$

In the above equations the sign of time t has again been reversed so that t is always non-negative and the scan goes from $\theta_{dmax}$ to $\theta_{dmin}$ as t increases from 0. The constant of integration C can be easily computed by substituting t= 0 and $\theta_d=\theta_{max}$ into the equation for C.

The above equations are used in modes 2 and 3 until the value of $los_D$ reaches $X_{GSD}/2$. The depression angle at which this occurs is:

$$i_{GSD}=\frac{x_{GSD}}{2}$$

$$\frac{h*\theta_{det}}{\sin(\theta_{dcutoff})}=\frac{\sqrt{2}*GSD}{2}$$

$$\theta_{dcutoff}=\arcsin\left(\frac{\sqrt{2}*h*\theta_{det}}{GSD}\right)$$

It is important to note that the conditions which may arise are: $\theta_{dcutoff} \geq \theta_{dmax}$, $\theta_{dmax} > \theta_{dcutoff} > \theta_{dmin}$, or "$_{dmin} \geq \theta_{dcutoff} \geq \theta_{dmax}$ then the equations above will not be used as the scan will be completely described by the equations presented below. If $\theta_{dmax} > \theta_{dcutoff}$ we can solve for $t_{cutoff}$ by substituting $\theta_{dcutoff}$ into the equation for t above. If $t_{cutoff} \geq t_{sused}$ then the scan will be completely defined by the equations above, and $\theta_{dmin}$ can be found by substituting $t_{end}$ into the equation for $\theta_d(t)$. If $t_{cutoff} < t_{sused}$ then "$_{dmax} > \theta_{dcutoff} > \theta_{dmin}$, the first part of the scan will be described by the equations above, and the second part by the equations presented below.

For $\theta_{dcutoff} > \theta_{dmin}$, $X_{GSD}$ is allowed to vary in order to maintain a constant GSD as follows:

$$i_{GSD} * x_{GSD} = GSD^2$$

$$\frac{h * \theta_{det}}{\sin(\theta_d)} * \frac{h * \frac{\partial \theta_d}{\partial} * \frac{1}{lr}}{\sin(\theta_d)} = GSD^2$$

$$\omega(t) = \frac{\partial \theta_d}{\partial t} = \frac{lr}{\theta_{det}} * \left(\frac{GSD}{h}\right)^2 * \sin 2(\theta_d)$$

$$\omega(t) = \frac{\partial \theta_d}{\partial t} = A * \sin 2(\theta_d)$$

$$A = \frac{lr}{\theta_{det}} * \left(\frac{GSD}{h}\right)^2$$

Solving the above equation for $\theta_d$ as a function of time, and then differentiating to get $\omega(t)$, we get:

$$-\frac{1}{A * \tan(\theta_d)} = C - t$$

$$C = t - \frac{1}{A * \tan(\theta_d)}$$

$$\theta_d(t) = \arctan\left(-\frac{1}{A * (C - t)}\right)$$

$$\omega(t) = \frac{\partial \theta_d}{\partial t} = \frac{A}{(A * (C - t))^2 + 1}$$

In the above equations the sign of time t has again been reversed so that t is always non-negative and the scan goes from $\theta_{dmax}$ to $\theta_{dmin}$, as t increases from 0. If $\theta_{dcutoff} \geq \theta_{dmax}$ the constant of integration C can be easily computed by substituting t=0 and $\theta_d = \theta_{dmax}$ into the equation for C. If $\theta_{dmax} > \theta_{dcutoff} > \theta_{dmin}$ then the constant of integration C is computed by substituting $t - t_{tcutoff}$ and $\theta_d = \theta_{dcutoff}$ into the equation for C. $\theta_{dmin}$ Can be found by substituting $t_{end}$ into the equation for $\theta_d(t)$.

5.2.4 Polynomial Approximation for Modes 2 and 3

To find a quadratic polynomial approximation to the exact solution for the modes 2 and 3 angular scan velocity three equations in three unknowns are set up and solved for the coefficients. If the scan is completely described by either the first set or the second set of mode 2 and 3 equations presented in Section 5.1 then only one set of equations must be solved. If however $\theta_{dmax} > \theta_{dcutoff} > \theta_{dmin}$ then the scan will consist of two parts: the first described by the constant cross-track GSD equations, and the second described by the variable cross-track GSD equations. Thus, two sets of equations will have to be solved to find polynomial approximations for each part of the scan.

It is desirable to obtain an approximation in which t begins at 0 and increases regardless of whether the scan is a forward ($\theta_{dmax}$ to $\theta_{dmin}$) Or reverse ($\theta_{dmin}$ to $\theta_{dmax}$) scan. Therefore, in setting up the equations for a forward scan, use time $t_{poly}$ in the approximate equations and $t_{exact} = t_{poly}$ in the exact equations. In setting up the equations for a reverse scan, use $t_{poly}$ in the approximate equation and $t_{exact} = (t_{sused} - t_{poly})$ for the exact equations and, if the scan is a two-part scan as discussed above, set $t_{cutoff} = (t_{sused} - t_{cutoff})$.

It is desired to have (possibly two sets of) three equations in three unknowns of the following form:

$$\omega_{exact}(t_{exact}) = a * t_{poly}^2 + b * t_{poly} + c.$$

For one part scan, set $t_0 = 0$ and $\Delta t = t_{sused}$; for a two-part scan, first solve the equations using $t_0 = 0$ and $\Delta t = t_{cutoff}$, then using $t_0 = t_{cutoff}$ and $\Delta t = (t_{sused} - t_{cutoff})$. Pick values of $t_{poly} = t_0$, $t_0 + \Delta t/2$, and $t_0 + \Delta t$; compute $t_{exact}$ as described above; set up the equations; and solve for a, b, and c.

For each set of equations the result will be an approximate solution for $\omega(t)$ of the form:

$$\omega_{poly}(t_{poly}) = a * t_{poly}^2 + b * t_{poly} + c$$

in which t begins as $t_0$ and increases to $t_0 + \Delta t$ regardless of the scan direction. For a two part scan, use the first polynomial if $t < t_{cutoff}$, the second if $t \geq t_{cutoff}$.

5.3 Pixel Aspect Ratio Correction Procedure

As described above, in step 308 the electronic signal representing the imagery data are processed and the pixel aspect ratio corrected. The pixel aspect ratio correction will now be discussed in detail. This subsection presents the correction in 2 steps. The first step is a derivation of the correction and the second step is an implementation of the pixel aspect ratio correction procedure.

5.3.1 Derivation

The EO-LOROPS GES must produce minified view images via pixel averaging "on-the-fly" (in real time) as data are received or played back from a digital tape recorder. The minified view must fit into a $n_{minif} \times n_{minif}$ pixel buffer and the pixels in the minified view must have an angular aspect ratio of 1:1. For an image collected using a constant angular scan velocity the computation of the reduction factor is relatively simple:

$$n_{ave} = \text{truncate\_to\_integer}\left(\frac{\max(n_{lines}, n_{det} - 2) + n_{minif} - 1}{n_{minif}}\right)$$

However, for an image with variable angular pixel aspect ratios, the averaging factor in the line (cross-track) direction will vary because the angle represented by each line varies. What is desired is a function indicating for each line in the minified view image how many lines are to be averaged from the full resolution image. For two-part scans two such functions are required. To find this function, first compute $n_{avg}$ using:

$$\frac{\theta_{dmax} - \theta_{dmin}}{\theta_{det}}$$

in place of $n_{lines}$:

$$n_{ave} = \text{truncate\_to\_integer}\left(\frac{\max\left(\frac{\theta_{dmax} - \theta_{dmin}}{\theta_{del}}, n_{del} - 2\right) + n_{minif} - 1}{n_{minif}}\right)$$

This value of $n_{avg}$ is used as the reduction factor in the pixel (in-track) dimension. The angle corresponding to this number of pixels is:

$$\Delta\theta_{minif} = n_{avg} * \theta_{del}.$$

The next step is to find a third-order polynomial approximation of time t as a function of angle $\theta_{poly}$ scanned since the start of the scan. Integrating the following:

$$\omega_{poly}(t_{poly}) = a * t_{poly}^2 + b * t_{poly} + c$$

yields:

$$\theta_{poly}(t_{poly}) = \frac{a}{3} * t_{poly}^3 + \frac{b}{2} * t_{poly}^2 + c * t_{poly} + d.$$

For a one-part scan or the first part of a two-part forward scan, d=0.

For the second part of a two-part forward scan:

$$d = (\theta_{dmax} - \theta_{dcutoff}) - \frac{a}{3} * t_{cutoff}^3 + \frac{b}{2} * t_{cutoff}^2 + c * t_{cutoff}$$

For a reverse scan substitute $(\theta_{cutoff} - \theta_{dmin})$ for $(\theta_{dmax} - \theta_{dcutoff})$ and set $t_{cutoff} = (t_{sused} - t_{cutoff})$. The coefficients a, b, and c are for the second part of the scan. Now, four equations in four unknowns are set up to find:

$$t(\theta_{poly}) = a_t * \theta_{poly}^3(t_{poly}) + b_t * \theta_{poly}^2(t_{poly}) + c_t * \theta_{poly}(t_{poly}) + d_t$$

Through a series of substitutions one can now find a function $n_{lg}$ of fine number in the minified view image $l_{minif}$ that gives the number of lines in the full resolution image to be used to create one line in the mini fled view image:

$$t(\theta_{poly} + \Delta\theta_{minif}) - t(\theta_{poly}) = \quad 3 * a_t * \Delta\theta_{minif} * \theta_{poly}^2 +$$
$$(3 * a_t * \Delta\theta_{minif} + 2 * b_t) * \Delta\theta_{minif} *$$
$$\theta_{poly} + ((a_t * \Delta\theta_{minif} + b_t) *$$
$$\Delta\theta_{minif} + c_t) * \Delta\theta_{minif}$$

where:

$$\theta_{poly} = l_{minif} * \Delta\theta_{minif}$$

and:

$$t = \frac{l_{full}}{lr}$$

these volumes can be substituted to arrive at:

$$l_{full}(l_{minif} + 1) - l_{full}(l_{minif}) = \quad 3 * a_t * \Delta\theta_{minif}^3 *$$
$$lr * l_{minif}^2 + (3 * a_t * \Delta\theta_{minif} +$$
$$2 * b_t) * \Delta\theta_{minif}^2 * lr * l_{minif} +$$
$$((a_t * \Delta\theta_{minif} + b_t) * \Delta\theta_{minif} + c_t) *$$
$$\Delta\theta_{minif} * lr$$

To express this equation in simpler terms, define:

$$a_{lg} = 3 * a_t * \Delta\theta_{minif}^3 * lr$$

$$b_{lg} = (3 * a_t * \Delta\theta_{minif} + 2 * b_t) * \Delta\theta_{minif}^2 * lr$$

$$c_{lg} = ((a_t * \Delta\theta_{minif} + b_t) * \Delta\theta_{minif} + c_t) * \Delta\theta_{minif} * lr$$

substituting these terms yields:

$$n_{lg}(l_{minif}) = a_{lg} * l_{minif}^2 + b_{lg} * l_{minif} + c_{lg}.$$

5.3.2 Implementation

When it is time to compute line number $l_{minif}$ (zero relative) in the minified view image, the function $n_{lg}(l_{minif})$ is evaluated. Front-end electronics in the GES obtains $n_{lg}(l_{minif})$ full resolution lines, and averages down by $n_{avg}$ in the pixel (in-track) dimension and by $n_{lg}(l_{minif})$ in the line (cross-track) dimension. Evaluation of $n_{lg}(l_{minif})$ can be done without any multiplications within a loop as demonstrated by the following pseudo-code:

```
nlg = (alg * l_initial + blg) * l_initial + clg
inc = alg * (2 * l_initial + 1) + blg
for ( l = l_initial; l < l_last; l++)
    /* note letter l, not    number 1 */
    {
    /* at this point nlg is correct for the current value of l */
    nlg += inc
    inc +=   2 * alg
    }
```

In general the value of $n_{lg}(l_{minif})$ will not be an integer, yet for a fast hardware implementation it is desired to use an integral number of full resolution image lines to construct each minified view line. Therefore as each minified view line is computed we must round $n_{lg}(l_{minif})$ to the nearest integer and add the (positive or negative) error amount to the next value of $n_{lg}(l_{minif})$. In this way the corrected image will "track" an exactly interpolated correction to the nearest full resolution line number. The following pseudo-code accomplishes the angular pixel aspect ratio correction using shifted 32-bit integer arithmetic.

```
/*
 * Set up 32-bit integer numbers needed for aspect ratio correction. The
 * only floating point numbers are "theta"s and flttemp. This would be
 * done by the airborne system and the various 32-bit numbers put into the
 * pre-frame file (prf). The prf would contain:
 *
 * nlines              2 bytes
 * navg                1 byte
 * nminif_part[2]      4 bytes
 * nlg_part[2]         8 bytes
 * inc27_part[2]       8 bytes
 * inc38_part[2]       8 bytes
 * inc38_2a_part[2]    39 bytes
 */
#define SH       27
#define SH2      11
#define MASK     (~(2^SH-1))
#define MASK2    (~(2^SH2-1))
npart = 1
if (one-part scan)
        nminif_part[0] = ceil((theta_d_max - theta_d_min) / delta_theta_minif)
else
{
    npart = 2
    if    (forward scan)
            nminif_part[0] = ceil((theta_d_max - theta_min) / delta_theta_minif)
    else
            nminif_part[0]  =  ceil((theta_cutoff  -  theta_d_min)  /
delta_theta_minif)
}
nminif_part[[1] = ceil((theta_d_max - theta_d_min) / delta_theta_minif)
for ( p - 0; p < npart; p++ ) /* for each part of the scan */
{
    lminif = p * nminif_part[p]    /* minified view line num at start of part */
    nlg_part[p] = round(((alg[p ] * lminif + blg[p]) * lminif + clg[p]) * 2^SH)
    flttemp = (alg[p] * (2 * lminif + 1) + blg[p]* 2^SH
    inc27_part[p] = truncate(flttemp)
    inc38_part[p] = round((flttemp - inc27_part[p]) * 2^SH2)
    inc38_2a_part[p] = round(2 * alg[p] * 2^(SH+SH2))
}
/*
 * Perform angular pixel aspect ratio correction. Thus is done by the GES
 * front-end electronics.
 */
for ( p - 0, lminif = 0, rem - 0; lminif < nminif_part[p]; p++ )
{
    /* get parameters for this part of scan */
        nminif - nminif_part[p]
        nlg - ngl_part[p]
        inc27 = inc27_part[p]
        inc38 = inc38_part[p]
        inc38_2a = inc38_2a_part[p]
    /* create minified view lines */
        for ( ; lminif < nminif; lminif++ )
        {
            nlg_plus_rem = nlg + rem
            nlg_plus_rem_plus_half = nlg_plus_rem + 2^(SH-1)
            nlg_integer = nlg_plus_rem_plus_half >> SH
            if ( nlg_integer < 1 )
                nlg_integer = 1
            /* at this point use navg, nlg_integer to do averaging */
            rem - nlg_plus_rem - (nlg_plus_rem_plus_half & MASK)
            inc27 += inc38 >> SH2
            nlg += inc27
            inc38 -= inc38 & MASK2
            inc38 += inc38_2a
        }
}
```

6.0 Image Interpretability Rating Scale (IIRS)

RATING CATEGORY 0

Useless for interpretation due to cloud cover, poor resolution, etc.

RATING CATEGORY 1

Ground Resolved Distance: Greater than 9 meters (>29.5 ft.) (>354 inches).

Detect the presence of larger aircraft at an airfield.

Detect surface ships.

Detect ports and harbors (including piers and warehouses)

Detect railroad yards and shops.

Detect coasts and landing beaches.

Detect surface submarines.

Detect armored artillery ground force training areas.

Recognize urban areas.

Recognize terrain.

RATING CATEGORY 2

Ground Resolved Distance: 4.5 to 9 meters (14.45 to 29.5 ft.) (177 to 354 inches)

Detect bridges.

Detect ground forces installations (including training areas, administration/barracks buildings, vehicle storage buildings, and vehicle parking areas.

Detect airfield facilities (count accurately all larger aircraft by type, straight-wing and swept/delta-wing).

Recognize ports and harbors (including large ships and drydocks).

RATING CATEGORY 3

Ground Resolved Distance: 2.5 to 4.45 meters (8.2 to 14.75 ft.) (98 to 177 inches)

Detect communications equipment (radio/radar).

Detect supply dumps (POL/Ordnance).

Detect and count accurately all straight-wing aircraft, all swept-wing aircraft and all delta-wing aircraft.

Detect command and control headquarters.

Detect surface-to-surface and surface-to-air missile sites (including vehicles and other pieces of equipment).

Detect land minefields.

Recognize bridges.

Recognize surface ships (distinguish between a cruiser and a destroyer by relative size and hull shape).

Recognize coast and landing beaches.

Recognize railroad yards and shops.

Identify airfield facilities.

Identify urban areas.

Identify terrain.

RATING CATEGORY 4

Ground Resolved Distance: 1.2 to 2.5 meters (3.94 to 8.2 ft.) (47.25 to 98 inches)

Detect rockets and artillery.

Recognize troop units.

Recognize aircraft such as FAGOT/MIDGET when singly deployed).

Recognize missile sites (SSM/SAM). Distinguish between missile types by the presence and relative position of wings and control fins.

Recognize nuclear weapons components.

Recognize land minefields.

Identify ports and harbors.

Identify railroad yards and shops.

Identify trucks at ground force installations as cargo, flatbed, or van.

Identify a KRESTA by the helicopter platform flush with the fantail, a KRESTA II by the raised helicopter platform (one deck level above fantail and flush with the main deck).

RATING CATEGORY 5

Ground Resolved Distance: 0.75 to 1.2 meters (2.46 to 3.94 ft.). (29.53 to 47.25 inches Detect the presence of call letters or numbers and alphabetical country designator on the wings of large commercial or cargo aircraft (where alpha-numerics are 3 ft. high or greater).

Recognize command and control headquarters.

Identify a singly deployed tank at a ground forces installation as light or medium/heavy.

Perform Technical Analysis on airfield facilities.

Perform Technical Analysis on urban areas.

Perform Technical Analysis on terrain.

RATING CATEGORY 6

Ground Resolved Distance: 40 to 75 centimeters (1.31 to 2.46 ft.) (15.75 to 7.87 inches)

Recognize radio/radar equipment.

Recognize supply dumps (POL/Ordnance).

Recognize rockets and artillery.

Identify bridges.

Identify troop units.

Identify FAGOT or MIDGET by canopy configuration when singly deployed.

Identify the following ground force equipment; T-54/55 tank, BTR-50 armored personnel carrier, 57 mm AA gun.

Identify by type, RBU installations (e.g., 2500 series), torpedo tubes (e.g., 21 inch/53.34 cm), and surface-to-air missile launchers on a KANIN DDG, KRIVAC DDGSP, or KRESTA II.

Identify a ROMEO-class submarine by the presence of the cowling for the snorkel induction and the snorkel exhaust.

Identify a WISKEY-class submarine by the absence of the cowling and exhaust.

RATING CATEGORY 7

Ground Resolved Distance: 20 to 40 centimeters (0.66 to 1.31 ft.) (7.87 to 15.75 inches)

Identify radar equipment.

Identify major electronics by type on a KILDEN DDGS or KASHIN DLG.

Identify command and control headquarters.

Identify land minefields.

Identify the general configuration of an SSBN/SSGN submarine sail, to include relative placement of bridge periscope(s) and main electronics/navigation equipment.

Perform Technical Analysis on ports and harbors.

Perform Technical Analysis on railroad yards and shops.

Perform Technical Analysis on roads.

RATING CATEGORY 8

Ground Resolved Distance: 10 to 20 centimeters (0.33 to 0.66 ft.) (3.94 to 7.87 inches)

Identify supply dumps (POL/Ordnance).

Identify rockets and artillery.

Identify aircraft.

Identify missile sites (SSM/SAM).

Identify surface ships.

Identify vehicles.

Identify surfaced submarines (including components such as ECHO II SSGN sail missile launcher elevator guide and major electronics/navigation equipment by type).

Identify, on a KRESTA II, the configuration of major components of larger electronics equipment and smaller electronics by type.

Identify limbs (arms, legs) on an individual.

Perform Technical Analysis on bridges.

Perform Technical Analysis on troop units.

Perform Technical Analysis on coast and landing beaches.

RATING CATEGORY 9

Ground Resolved Distance: less than 10 centimeters (<0.33 ft.) (<3.94 inches)

Identify in detail the configuration of a D-30 howitzer muzzle brake.

Identify in detail on a KILDEN DDGS the configuration of torpedo tubes and AA gun mountings (including gun details).

Identify in detail the configuration of an ECHO II SSGN sail including detailed configuration of electronics communications equipment and navigation equipment.

and subsequently, to calibrate the Imagery Interpretability Rating Scale.)

GROUND RESOLUTION: Ground Resolution, a term used in photo-interpretation, is a subjective numerical estimate of the limiting size of ground objects imaged on film. It does not require a test target for its determination and may not equate to Ground Resolved Distance. The degree to which an individual can detect, recognize, and identify ground objects leads to his estimate of ground resolution.

DETECTION: In imagery interpretation, the discovering of the existence of an object but without recognition of the object.

RECOGNITION: The determination by any means of the friendly or enemy character of the individuality of another, or of objects such as aircraft, ships, tanks, or of a phenomena such as communications or electronics patterns.

IDENTIFICATION: In imagery interpretation, the discrimination between objects within a particular type or class.

TECHNICAL ANALYSIS: the ability to describe precisely a feature, object, or component imaged on film.

Appendix - Page 8
MEDIUM GROUND OBJECT SIZES

| No. | Type Of Target | Detection | Recognition | Identification | Technical Analysis |
|---|---|---|---|---|---|
| 1 | Bridges | 6.1 m (20 ft.) | 4.6 m (15 ft.) | 1.5 m (5 ft.) | 0.3 m (1 ft.) |
| 2 | Communications Equipment | | | | |
| 3 | Supply Dumps (POL & Ordnance) | 3.05 m (10 ft.) | 0.6 m (2 ft.) | 0.15 m (6 in.) | 25.4 m (1 in.) |
| 4 | Troop Units (Bivouac; Convoy) | 6.1 m (20 ft.) | 2.13 m (7 ft.) | 0.6 m (2 ft.) | 152 mm (6 in.) |
| 5 | Airfield Facilities | 6.1 m (20 ft.) | 4.6 m (15 ft.) | 3.05 m (10 ft.) | 0.15 m (6 in.) |
| 6 | Rockets, Missiles & Artillery | 0.9 m (3 ft.) | 0.6 m (2 ft.) | 0.15 m (6 in.) | 38 mm (1.5 in.) |
| 7 | Aircraft | 4.6 m (15 ft.) | 1.5 m (5 ft.) | 0.15 m (6 in.) | 38 mm (1.5 in.) |
| 8 | Command & Control Headquarters | 3.05 m (10 ft.) | 0.9 m (3 ft.) | 0.3 m (1 ft.) | 76 mm (3 in.) |
| 9 | Missile Sites (SSM/SAM) | 3.05 m (10 ft.) | 1.5 m (5 ft.) | 0.15 m (6 in.) | 38 mm (1.5 in.) |
| 10 | Surface Ships | 15.25 m (50 ft.) | 4.6 m (15 ft.) | 0.15 m (6 in.) | 38 mm (1.5 in.) |
| 11 | Nuclear Weapons Components | 2.4 m (8 ft.) | 1.5 m (5 ft.) | 0.3 m (1 ft.) | 12.67 mm (1.5 in.) |
| 12 | Vehicles | 1.5 m (5 ft.) | 0.6 m (2 ft.) | 0.15 m (6 in.) | 38 mm (1.5 in.) |
| 13 | Land Minefields | 3.05 m (10 ft.) | 1.5 m (5 ft.) | 0.3 m (1 ft.) | 76 mm (3 in.) |
| 14 | Ports and Harbors | 30.5 m (100 ft.) | 6.1 m (20 ft.) | 1.5 m (5 ft.) | 0.38 m (1.25 ft.) |
| 15 | Coasts and Landing Beaches | 15.25 m (50 ft.) | 4.6 m (15 ft.) | 0.6 m (2 ft.) | 152 mm (6 in.) |
| 16 | Railroads and Railroad Yards, Shops | 15.25 m (50 ft.) | 4.6 m (15 ft.) | 1.5 m (5 ft.) | 0.38 m (1.25 ft.) |
| 17 | Roads | 6.1 m (20 ft.) | 4.6 m (15 ft.) | 1.5 m (5 ft.) | 0.38 m (1.25 ft.) |
| 18 | Urban Areas | 16 m (200 ft.) | 15.25 m (50 ft.) | 3.05 m (10 ft.) | 0.76 m (2.5 ft.) |
| 19 | Terrain | Not applicable | 91.5 m (300 ft.) | 3.05 m (10 ft.) | 0.76 m (2.5 ft.) |
| 20 | Surfaced Submarines | 7.6 m (25 ft.) | 4.6 m (15 ft.) | 0.15 m (6 in.) | 25.4 mm (1 in.) |

Perform Technical Analysis on radio/radar equipment.

Perform Technical Analysis on supply dumps (POL/Ordinance).

Perform Technical Analysis on rockets and artillery.

Perform Technical Analysis on missile sites.

Perform Technical Analysis on nuclear weapons components.

DEFINITIONS

The following terms and definitions are used for the purpose of this Section 6.0.

GROUND RESOLVED DISTANCE: Ground Resolved Distance (GRD) is the minimum test target element resolved on the ground. With a system that produces a GRD of 1.0 foot, the smallest bar of the test target that can be distinguished in the best case has a physical width of 0.5 foot. (A Tri-bar test target was used to determine GRD

7.0 Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for performing long range, sector scan panoramic electro-optical reconnaissance of a scene, the reconnaissance performed at increased scan velocities for a given ground resolved distance and forward overlap, comprising:

(1) a focal plane array configured to detect an image of the scene and to convert said image into an electronic charge representation of said image;

(2) a main electronics unit, coupled to said focal plane array, configured to convert said electronic charge representation into a digital image data signal, wherein said digital image data signal is a digital representation of said image;

(3) focusing means, coupled to said focal plane array, for focusing a portion of the scene onto said focal plane array, wherein said portion of the scene is defined by a projection of said focal plane array;

(4) determining means for determining a non-linear scan velocity;

(5) scanning means. coupled to said focusing means for scanning said projection of said focal plane array across the scene at said non-linear scan velocity; and (6) processing means, coupled to said main electronics unit, for processing said digital image data signal to provide a visual image signal representing a corrected image, said corrected image having a pixel aspect ratio corrected to remove the effects of said non-linear scan velocity.

2. The system of claim 1, wherein said determining means is configured to determine said non-linear scan velocity using an exact solution, and wherein said exact solution determines said non-linear scan velocity such that a cross-track ground sample distance is kept constant throughout the scan.

3. The system of claim 1, wherein said determining means is configured to determine said non-linear scan velocity using a polynomial approximation.

4. The system of claim 1, wherein said focal plane array is a charge coupled device matrix, said focusing means is an optical camera, and said scanning means is a rotating camera barrel.

5. The system of claim 1, further comprising an airborne craft for supporting said focal plane array, said main electronics unit and said focusing means said determining means, said scanning means and said processing means.

6. The system of claim 1, further comprising an air-to-ground data link coupled between said focal plane army and said fourth means, for transmitting said electronic signal from said airborne craft to a ground station.

7. The system of claim 1, further comprising a data base, coupled to said main electronics unit, for storing digital image data signal.

8. The system of claim 1, further comprising means, coupled to said means for displaying said corrected image.

9. The system of claim 1, further comprising fifth means, coupled to said focal plane array, for compressing said digital image data signal to form a compressed digital image data signal, and sixth means, coupled to said fifth means, for decompressing said compressed digital image data to reproduce said digital image data signal.

10. A method for optimizing long range, sector scan panoramic electro-optical reconnaissance of a scene from an airborne craft comprising the steps of:

(1) determining a camera scan rate and a focal plane array read rate for a desired level of operational performance;

(2) determining a non-linear scan velocity if said scan rate is above a threshold level;

(3) scanning the camera across the scene at said non-linear scan velocity determined in step (2);

(4) focusing an image of the scene scanned in said step (3) onto a focal plane array and converting the image into an electronic signal that represents the scene;

(5) processing said electronic signal to generate a digital image of the scene, wherein said processing comprises a step of correcting a pixel aspect ratio of said digital image to remove effects of said non-linear scan velocity.

11. The method of claim 10, further comprising the step of displaying said corrected image.

12. The method of claim 10, wherein said step (1) comprises the steps of:

(a) determining an actual scan time used;

(b) determining a system line rate;

(c) calculating the number of lines in a scan, wherein the calculation is made using said actual scan time determined in said step (a) and said system line rate determined in said step (b); and (d) determining an end-of-frame time as a ratio of said number of lines in a scan to said line rate.

13. The method of claim 10, wherein said step (1) comprises the steps of:

(a) determining an actual scan time used;

(b) determining a desired number of lines in a scan;

(c) calculating a system line rate as a ratio of said number of lines determined in said step (b) to said actual scan time used determined in said step (a); and (d) determining an end-of-frame time as a ratio of said number of lines in a scan to said line rate.

14. The method of claim 12, wherein said step for determining said actual scan time used comprises the steps of:

(i) determining a slant range;

(ii) computing an in-track distance in a near-field, wherein said in-track distance is a function of said slant range determined in said step (i)

(iii) computing a cycle time as a fraction of said in-track distance computed in said step (ii), wherein said fraction is determined to provide a desired amount of forward overlap;

(iv) calculating available a scan time as a function of said cycle time; and (v) calculating said actual scan time used as a function of said available scan time.

15. The method of claim 13, wherein said step for determining said scan time used comprises the steps of:

(i) determining a slant range;

(ii) computing an in-track distance in a near-field, wherein said in-track distance is a function of said slant range determined in said step (i)

(iii) computing a cycle time as a fraction of said in-track distance computed in said step (ii), wherein said fraction is determined to provide a desired amount of forward overlap;

(iv) calculating an available scan time as a function of said cycle time; and (v) calculating said actual scan time used as a function of said available scan time.

16. The method according to claim 10, wherein said step (2) comprises the steps of:

(a) computing a cross-track ground sample distance;

(b) computing an angular scan velocity needed to keep said cross-track ground sample distance constant;

(c) calculating a camera depression angle as a function of time based on said angular scan velocity; and (d) differentiating said depression angle calculated in said step (c) to obtain a non-linear scan velocity.

17. The method according to claim 10, wherein said step (2) comprises the steps of:

(a) calculating a cross-track ground sample distance required to maintain a constant overall ground sample distance;

(b) holding said cross-track ground sample distance constant for large depression angles;

(c) computing an angular scan velocity required to maintain said cross-track ground sample distance;

(d) calculating a camera depression angle as a function of time based on said angular scan velocity; and (e) differentiating said depression angle calculated in said step (c) to obtain a non-linear scan velocity.

18. The method according to claim 10, wherein said step (2) comprises the step of using a quadratic polynomial approximation to determine a non-linear scanning velocity.

19. The method according to claim 10, wherein said step (5) comprises the steps of:

(a) deriving a correction for said pixel aspect ration of said digital image; and (b) implementing said correction to correct said pixel aspect ratio.

20. The method according to claim 19, wherein said step (a) comprises the steps of:

(i) computing an averaging factor to produce minified view images;

(ii) computing a line group angle as the product of said averaging factor and a detector angle;

(iii) determining a third-order polynomial approximation of time as a function of an angle scanned since the scan was started; and (iv) determining a full resolution line group based on said line group angle using said third-order polynomial; and said step (b) comprises the steps of:

(i) evaluating said full resolution line group;

(ii) rounding said full resolution line group to a nearest integer value; and (iii) adding the amount of the rounding to a next value for said full resolution line group.

21. A system for performing long range, sector scan panoramic electro-optical reconnaissance of a scene from an airborne craft, the reconnaissance performed at increased scan velocities for a given ground resolved distance, and forward overlap, comprising:

first means for detecting an image of a portion of the scene and converting said image into a digital image data signal, wherein said digital image data signal is a digital representation of said image;

second means, coupled to said first means, for focusing said portion of the scene onto said first means, and for scanning said portion of the scene across the entire scene at a non-linear scan velocity; and third means, coupled to said first means, for processing said digital image data signal to provide a visual image data signal representing a corrected image, said corrected image having a pixel aspect ratio corrected to remove the effects of said non-linear scan velocity.

22. The system of claim 21, further comprising fourth means, coupled to said second means, configured to use an exact solution to determine said non-linear scan velocity, and wherein said exact solution determines said non-linear scan velocity such that a cross-track ground sample distance is constant throughout the scan.

23. The system of claim 21, further comprising fourth means, coupled to said second means, configured to use a polynomial approximation solution to determine said non-linear scan velocity.

24. The system of claim 21, further comprising fourth means, coupled to said first means, for transmitting said digital image data signal from the airborne craft to the ground.

25. The system of claim 21, further comprising fourth means, coupled to said first means, for storing said digital image data signal.

26. The system of claim 21, further comprising fourth means, coupled to said third means, for displaying said corrected image.

27. The system of claim 21, further comprising fourth means, coupled to said focal plane array, for compressing said digital image data signal to form a compressed digital image data signal, and fifth means, coupled to said fourth means, for decompressing said compressed digital image data signal.

28. A system for performing sector scan reconnaissance of a scene, comprising:

focusing means for focusing a portion of the scene onto a detector, wherein said portion of the scene is defined by a projection of said detector;

determining means for determining a non-linear scan velocity and;

scanning means for scanning said projection across the scene at said determined-non-linear scan velocity.

29. The system of claim 28, wherein said determining means comprises means for determining said non-linear scan velocity using an exact solution.

30. The system of claim 28, wherein said determining means comprises means for determining said non-linear scan velocity using a polynomial approximation.

* * * * *

UNITED STATES PATENT AND TRADEMARK OFFICE
CERTIFICATE OF CORRECTION

PATENT NO. : 5,481,479
DATED : January 2, 1996
INVENTOR(S) : Wight, et al

It is certified that error appears in the above-indentified patent and that said Letters Patent is hereby corrected as shown below:

In column 5, at line 53, delete "dam" and insert therein --data--;

In column 11, at line 23, delete "dam" and insert therein --data--;

In column 11, at line 37, insert --The-- before "above;"

In column 15, at line 25, delete:

$$"n_{lines} = \text{truncate\_to\_integer}(lr * t_{sused})"$$

and insert therein:

$$-- n_{lines} = \text{truncate\_to\_integer}(lr * t_{sused}) --;$$

In column 16, at line 20, delete:

$$" x_{GSD} = \frac{h * \frac{\partial \theta_d}{\partial t} * \frac{1}{lr}}{\sin(\theta_d)} = \frac{-h}{2 * lr * t_{sused}} * ln\left(\frac{1-cos(\theta_{dmin})}{1+cos(\theta_{dmin})} * \frac{1+cos(\theta_{dmax})}{1-cos(\theta_{dmax})}\right) "$$

and insert therein:

$$-- x_{GSD} = \frac{h * \frac{\partial \theta_d}{\partial t} * \frac{1}{lr}}{\sin(\theta_d)} = \frac{-h}{2 * lr * t_{sused}} * ln\left(\frac{1-cos(\theta_{dmin})}{1+cos(\theta_{dmin})} * \frac{1+cos(\theta_{dmax})}{1-cos(\theta_{dmax})}\right) --$$

At column 32, line 41, delete "and;" and insert therein --; and--.

UNITED STATES PATENT AND TRADEMARK OFFICE
CERTIFICATE OF CORRECTION

PATENT NO. : 5,481,479

DATED : January 2, 1996

INVENTOR(S) : Wight et al.

It is certified that error appears in the above-indentified patent and that said Letters Patent is hereby corrected as shown below:

Column 1, line 27, replace "dam" with --data--;

Column 4, line 4, replace "Dam" with --Data--; and

Column 8, line 45, please replace "air-m-ground" with --air-to-ground--.

Signed and Sealed this

Twenty-fifth Day of June, 1996

Attest:

BRUCE LEHMAN

Attesting Officer

Commissioner of Patents and Trademarks